(12) United States Patent
Nielsen

(10) Patent No.: US 10,558,901 B2
(45) Date of Patent: Feb. 11, 2020

(54) DEVICE FOR OUTPUTTING A MAGNETIC FIELD AND A METHOD OF OUTPUTTING A MAGNETIC FIELD

(71) Applicant: CARDLAB APS, Herlev (DK)

(72) Inventor: Finn Nielsen, Copenhagen S (DK)

(73) Assignee: CARDLAB APS, Herlev (DK)

( * ) Notice: Subject to any disclaimer, the term of this patent is extended or adjusted under 35 U.S.C. 154(b) by 0 days.

(21) Appl. No.: 15/566,858

(22) PCT Filed: Apr. 18, 2016

(86) PCT No.: PCT/EP2016/058569
§ 371 (c)(1),
(2) Date: Oct. 16, 2017

(87) PCT Pub. No.: WO2016/166376
PCT Pub. Date: Oct. 20, 2016

(65) Prior Publication Data
US 2018/0129922 A1    May 10, 2018

(30) Foreign Application Priority Data

Apr. 17, 2015   (EP) ..................................... 15164117

(51) Int. Cl.
*G06K 5/00*   (2006.01)
*G06K 19/06*  (2006.01)
(52) U.S. Cl.
CPC ............................... *G06K 19/06206* (2013.01)
(58) Field of Classification Search
CPC ....... G06K 19/06187; G06K 19/06196; G06K 19/06206; G06K 19/12
See application file for complete search history.

(56) References Cited

U.S. PATENT DOCUMENTS

| 3,894,275 A | 7/1975 | Baumans et al. |
| 3,958,235 A | 5/1976 | Duffy |
| (Continued) | | |

FOREIGN PATENT DOCUMENTS

| CA | 2317642 A1 | 3/2001 |
| CN | 1484812 A | 3/2004 |
| (Continued) | | |

OTHER PUBLICATIONS

International Search Report for International Application No. PCT/EP2016/058569 dated Jul. 14, 2016.

(Continued)

*Primary Examiner* — Steven S Paik
*Assistant Examiner* — April A Taylor
(74) *Attorney, Agent, or Firm* — Harness, Dickey & Pierce, P.L.C.

(57) ABSTRACT

A device for and a method of outputting a magnetic field which is selected according to the type of card reader into which the device is inserted. Different card readers have different reader head types and different number of reader heads, and different modes of outputting the magnetic field, usually with the same information contents, are selected in order to cater for different reader types. In one example, the sensing coils of different reader heads may have different angles to the swipe plane, so that different field line angles may be selected to adapt to the actual reader head.

20 Claims, 4 Drawing Sheets

(56) References Cited

U.S. PATENT DOCUMENTS

| | | | |
|---|---|---|---|
| 4,051,499 A | 9/1977 | Kondo | |
| 4,158,433 A | 6/1979 | Peterson et al. | |
| 4,304,992 A | 12/1981 | Kobayashi et al. | |
| 4,311,999 A | 1/1982 | Upton et al. | |
| 4,354,100 A | 10/1982 | Rohen | |
| 4,701,601 A | 10/1987 | Francini et al. | |
| 4,791,283 A | 12/1988 | Burkhardt | |
| 4,825,056 A | 4/1989 | Ohta et al. | |
| 4,829,166 A | 5/1989 | Froelich | |
| 4,873,397 A | 10/1989 | Masujima et al. | |
| 4,910,775 A | 3/1990 | Yves et al. | |
| 5,060,261 A | 10/1991 | Avenier et al. | |
| 5,130,522 A | 7/1992 | Yamanouchi et al. | |
| 5,136,644 A | 8/1992 | Audebert et al. | |
| 5,157,389 A | 10/1992 | Kurozu et al. | |
| 5,247,164 A | 9/1993 | Takahashi | |
| 5,397,881 A | 3/1995 | Mannik | |
| 5,478,994 A | 12/1995 | Rahman et al. | |
| 5,563,948 A | 10/1996 | Diehl et al. | |
| 5,566,982 A | 10/1996 | Lehureau et al. | |
| 5,627,355 A | 5/1997 | Rahman et al. | |
| 5,635,701 A | 6/1997 | Gloton | |
| 5,791,966 A | 8/1998 | Capps et al. | |
| 5,834,756 A | 11/1998 | Gutman et al. | |
| 5,896,325 A | 4/1999 | Fujioka | |
| 5,955,961 A | 9/1999 | Wallerstein | |
| 5,963,144 A | 10/1999 | Kruest | |
| 6,012,636 A | 1/2000 | Smith | |
| 6,206,293 B1 | 3/2001 | Gutman et al. | |
| 6,265,984 B1 | 7/2001 | Molinaroli | |
| 6,325,285 B1 | 12/2001 | Baratelli | |
| 6,327,376 B1 | 12/2001 | Harkin | |
| 6,404,409 B1 | 6/2002 | Solomon | |
| 6,424,033 B1 | 7/2002 | Akram | |
| 6,452,575 B1 | 9/2002 | Lin | |
| 6,592,044 B1 | 7/2003 | Wong et al. | |
| 6,603,879 B2 | 8/2003 | Haikin et al. | |
| 6,607,362 B2 | 8/2003 | Lum | |
| 6,609,654 B1 | 8/2003 | Anderson et al. | |
| 6,657,538 B1 | 12/2003 | Ritter | |
| 6,715,679 B1 | 4/2004 | Infosino | |
| 6,747,547 B2 | 6/2004 | Benson | |
| 6,755,341 B1 | 6/2004 | Wong et al. | |
| 6,774,474 B1 | 8/2004 | Caletka et al. | |
| 6,794,749 B2 | 9/2004 | Akram | |
| 6,805,288 B2 | 10/2004 | Routhenstein et al. | |
| 6,832,721 B2 | 12/2004 | Fujii | |
| 6,848,617 B1 | 2/2005 | Fries et al. | |
| 6,883,717 B1 | 4/2005 | Kelley et al. | |
| 6,906,425 B2 | 6/2005 | Stewart et al. | |
| 6,910,634 B1 | 6/2005 | Inose et al. | |
| 6,913,948 B2 | 7/2005 | Caletka et al. | |
| 6,919,220 B2 | 7/2005 | Akram | |
| 6,991,155 B2 | 1/2006 | Burchette, Jr. | |
| 7,028,897 B2 | 4/2006 | Fernandes et al. | |
| 7,044,394 B2 | 5/2006 | Brown | |
| 7,051,932 B2 | 5/2006 | Fernandes et al. | |
| 7,083,105 B2 | 8/2006 | Maruyama et al. | |
| 7,090,139 B2 | 8/2006 | Kasuga et al. | |
| 7,127,236 B2 | 10/2006 | Khan et al. | |
| 7,246,752 B2 | 7/2007 | Brown | |
| 7,252,232 B2 | 8/2007 | Fernandes et al. | |
| 7,278,025 B2 | 10/2007 | Saito et al. | |
| 7,337,326 B2 | 2/2008 | Palmer et al. | |
| 7,347,381 B2 | 3/2008 | Rathbun et al. | |
| 7,365,636 B2 | 4/2008 | Doi et al. | |
| 7,409,876 B2 | 8/2008 | Ganapathi et al. | |
| 7,525,374 B2 | 4/2009 | Robert et al. | |
| 7,597,267 B2 | 10/2009 | Miyazaki | |
| 7,609,146 B2 | 10/2009 | Tang et al. | |
| 7,823,794 B2 | 11/2010 | Li et al. | |
| 7,940,184 B2 | 5/2011 | Spivey, Jr. | |
| 7,954,724 B2 | 6/2011 | Poidomani et al. | |
| 8,015,592 B2 | 9/2011 | Doughty et al. | |
| 8,082,575 B2 | 12/2011 | Doughty et al. | |
| 8,103,881 B2 | 1/2012 | Doughty et al. | |
| 8,231,063 B2 | 7/2012 | Poidomani et al. | |
| 8,286,889 B2 | 10/2012 | Poidomani et al. | |
| 8,302,871 B2 | 11/2012 | Poidomani et al. | |
| 8,360,332 B2 | 1/2013 | Poidomani et al. | |
| 8,376,239 B1 | 2/2013 | Humphrey | |
| 8,480,002 B2 | 7/2013 | Poidomani et al. | |
| 8,499,334 B2 | 7/2013 | Doughty et al. | |
| 8,500,019 B2 | 8/2013 | Poidomani et al. | |
| 8,579,203 B1* | 11/2013 | Lambeth | G06Q 20/3415 235/380 |
| 8,590,796 B1 | 11/2013 | Cloutier et al. | |
| 8,827,153 B1 | 9/2014 | Rhoades et al. | |
| 8,888,009 B1* | 11/2014 | Mullen | G06K 7/084 235/449 |
| 9,016,584 B2 | 4/2015 | Doughty et al. | |
| 9,053,398 B1* | 6/2015 | Cloutier | G06K 19/06206 |
| 2002/0003169 A1 | 1/2002 | Cooper | |
| 2002/0032657 A1 | 3/2002 | Singh | |
| 2002/0043566 A1 | 4/2002 | Goodman et al. | |
| 2002/0104891 A1 | 8/2002 | Otto | |
| 2002/0139844 A1 | 10/2002 | Rochman et al. | |
| 2002/0152211 A1 | 10/2002 | Jam | |
| 2002/0153424 A1 | 10/2002 | Li | |
| 2003/0019942 A1 | 1/2003 | Blossom | |
| 2003/0071717 A1 | 4/2003 | Hagl et al. | |
| 2003/0106935 A1 | 6/2003 | Burchette | |
| 2003/0139984 A1 | 7/2003 | Seigel | |
| 2003/0169574 A1 | 9/2003 | Maruyama et al. | |
| 2003/0204526 A1 | 10/2003 | Salehi-Had | |
| 2003/0226041 A1 | 12/2003 | Palmer et al. | |
| 2004/0034782 A1 | 2/2004 | Park | |
| 2004/0035942 A1 | 2/2004 | Silverman | |
| 2004/0049460 A1 | 3/2004 | Doron et al. | |
| 2004/0098481 A1 | 5/2004 | Gunji et al. | |
| 2004/0111378 A1 | 6/2004 | Howell | |
| 2004/0129787 A1 | 7/2004 | Saito et al. | |
| 2004/0133787 A1 | 7/2004 | Doughty et al. | |
| 2004/0155845 A1 | 8/2004 | Smedley et al. | |
| 2004/0159700 A1 | 8/2004 | Khan et al. | |
| 2004/0177045 A1 | 9/2004 | Brown | |
| 2005/0001711 A1 | 1/2005 | Doughy et al. | |
| 2005/0116048 A1 | 6/2005 | Sauter et al. | |
| 2005/0235156 A1 | 10/2005 | Chen | |
| 2005/0240778 A1 | 10/2005 | Saito | |
| 2005/0277360 A1 | 12/2005 | Benedek et al. | |
| 2006/0000900 A1 | 1/2006 | Fernandes et al. | |
| 2006/0072355 A1 | 4/2006 | Ebihara et al. | |
| 2006/0091989 A1 | 5/2006 | Vinciarelli et al. | |
| 2006/0097368 A1 | 5/2006 | Seko | |
| 2006/0118621 A1 | 6/2006 | Burchette | |
| 2006/0124756 A1 | 6/2006 | Brown | |
| 2006/0161789 A1 | 7/2006 | Doughty et al. | |
| 2006/0175405 A1 | 8/2006 | Fernandes et al. | |
| 2006/0187046 A1 | 8/2006 | Kramer | |
| 2006/0214009 A1 | 9/2006 | Shikata et al. | |
| 2006/0249754 A1 | 11/2006 | Forman et al. | |
| 2006/0266831 A1 | 11/2006 | Kozlay | |
| 2006/0283958 A1 | 12/2006 | Osterweil | |
| 2006/0287964 A1 | 12/2006 | Brown | |
| 2006/0289657 A1 | 12/2006 | Rosenberg | |
| 2007/0075145 A1 | 4/2007 | Arendonk | |
| 2007/0100754 A1 | 5/2007 | Brown | |
| 2007/0136211 A1 | 6/2007 | Brown et al. | |
| 2007/0176622 A1 | 8/2007 | Yamazaki | |
| 2007/0208671 A1 | 9/2007 | Brown et al. | |
| 2007/0241183 A1 | 10/2007 | Brown et al. | |
| 2007/0241201 A1 | 10/2007 | Brown et al. | |
| 2007/0255657 A1 | 11/2007 | Brown | |
| 2007/0296551 A1 | 12/2007 | Beenau et al. | |
| 2008/0004935 A1 | 1/2008 | Marshall | |
| 2008/0029598 A1 | 2/2008 | Fernandes et al. | |
| 2008/0061148 A1 | 3/2008 | Tanner | |
| 2008/0116285 A1 | 5/2008 | Shoemaker | |
| 2008/0126262 A1 | 5/2008 | Brady et al. | |
| 2008/0128514 A1 | 6/2008 | Sabbah et al. | |
| 2009/0152364 A1 | 6/2009 | Spivey, Jr. | |
| 2009/0159663 A1 | 6/2009 | Mullen et al. | |
| 2009/0224035 A1 | 9/2009 | Deborgies | |

(56) References Cited

U.S. PATENT DOCUMENTS

| | | | |
|---|---|---|---|
| 2010/0079289 A1 | 4/2010 | Brandt et al. | |
| 2010/0265037 A1 | 10/2010 | Domsten et al. | |
| 2011/0108626 A1 | 5/2011 | Hepner et al. | |
| 2012/0068827 A1 | 3/2012 | Yi et al. | |
| 2012/0187199 A1 | 7/2012 | Poidomani et al. | |
| 2013/0320080 A1 | 12/2013 | Olson et al. | |
| 2014/0117094 A1* | 5/2014 | Workley | G06K 7/084 235/492 |
| 2015/0073983 A1* | 3/2015 | Bartenstein | G06Q 20/3415 705/41 |
| 2015/0170014 A1* | 6/2015 | Olson | G06Q 20/354 235/380 |
| 2016/0171361 A1* | 6/2016 | Chatterton | G06F 21/77 705/41 |

FOREIGN PATENT DOCUMENTS

| | | |
|---|---|---|
| CN | 103793674 A | 5/2014 |
| DE | 4244144 C1 | 5/1994 |
| DE | 19618144 C1 | 4/1997 |
| DE | 19648767 A1 | 6/1997 |
| DE | 19947180 A1 | 4/2001 |
| DE | 10140662 C1 | 3/2003 |
| DE | 10222847 A1 | 12/2003 |
| DE | 10342054 B4 | 4/2005 |
| EP | 0373411 A2 | 6/1990 |
| EP | 0789334 A2 | 8/1997 |
| EP | 0994439 A2 | 4/2000 |
| EP | 1014776 A1 | 6/2000 |
| EP | 1083527 A2 | 3/2001 |
| EP | 1230619 A1 | 8/2002 |
| EP | 1231562 A1 | 8/2002 |
| EP | 1326196 A1 | 7/2003 |
| EP | 1446759 A2 | 8/2004 |
| EP | 1459241 A2 | 9/2004 |
| EP | 1519415 A2 | 3/2005 |
| EP | 1535421 A1 | 6/2005 |
| EP | 1678582 A2 | 7/2006 |
| EP | 1714237 A2 | 10/2006 |
| EP | 1877967 A1 | 1/2008 |
| EP | 2172863 A2 | 4/2010 |
| EP | 3035230 A1 | 6/2016 |
| FR | 2728710 A1 | 6/1996 |
| FR | 2790084 A1 | 8/2000 |
| GB | 2243235 A | 10/1991 |
| GB | 2389218 A | 12/2003 |
| GB | 2398152 A | 8/2004 |
| JP | S57188852 A | 11/1982 |
| JP | S62-043792 A | 2/1987 |
| JP | H01196518 A | 8/1989 |
| JP | H01287535 A | 11/1989 |
| JP | H2307792 A | 12/1990 |
| JP | H4173194 A | 6/1992 |
| JP | H0667616 A | 3/1994 |
| JP | 2964414 B2 | 10/1999 |
| JP | 2001-14435 A | 1/2001 |
| JP | 3081811 U | 11/2001 |
| JP | 2004-78731 A | 3/2004 |
| JP | 2004-88646 A | 3/2004 |
| JP | 2004-151968 A | 5/2004 |
| JP | 2004-264440 A | 9/2004 |
| JP | 2005-517970 A | 6/2005 |
| JP | 2005-293485 A | 10/2005 |
| JP | 2006-300749 A | 11/2006 |
| JP | 2007-219807 A | 8/2007 |
| KR | 20010086928 A | 9/2001 |
| KR | 20020007576 A | 1/2002 |
| WO | WO-95/24733 A1 | 9/1995 |
| WO | WO-96/34333 A1 | 10/1996 |
| WO | WO-96/41377 A1 | 12/1996 |
| WO | WO-96/41507 A1 | 12/1996 |
| WO | WO-98/54912 A1 | 12/1998 |
| WO | WO 99/41696 A1 | 8/1999 |
| WO | WO-00/49561 A1 | 8/2000 |
| WO | WO-01/31577 A1 | 5/2001 |
| WO | WO-01/35496 A1 | 5/2001 |
| WO | WO-01/37205 A1 | 5/2001 |
| WO | WO-01/52204 A1 | 7/2001 |
| WO | WO-01/88659 A2 | 11/2001 |
| WO | WO-01/93238 A1 | 12/2001 |
| WO | WO-02/080638 A1 | 10/2002 |
| WO | WO-02/084602 A1 | 10/2002 |
| WO | WO-03/009223 A1 | 1/2003 |
| WO | WO-03/017211 A2 | 2/2003 |
| WO | WO-03/027949 A1 | 4/2003 |
| WO | WO-03/044721 A2 | 5/2003 |
| WO | WO-03/058391 A2 | 7/2003 |
| WO | WO-03/058947 A2 | 7/2003 |
| WO | WO-03/077618 A2 | 9/2003 |
| WO | WO-03/084124 A1 | 10/2003 |
| WO | WO-2004/025545 A2 | 3/2004 |
| WO | WO-2004/093341 A1 | 10/2004 |
| WO | WO-2004/099921 A2 | 11/2004 |
| WO | WO-2005/027030 A1 | 3/2005 |
| WO | WO-2005/036357 A2 | 4/2005 |
| WO | WO-2005/052846 A2 | 6/2005 |
| WO | WO-2005/059691 A2 | 6/2005 |
| WO | WO-2005/086102 A1 | 9/2005 |
| WO | WO-2005/088893 A1 | 9/2005 |
| WO | WO-2005/124659 A1 | 12/2005 |
| WO | WO-2006/095186 A1 | 9/2006 |
| WO | WO-2006/105092 A2 | 10/2006 |
| WO | WO-2006/116772 A1 | 11/2006 |
| WO | WO-2006/136229 A1 | 12/2006 |
| WO | WO-2007/022423 A2 | 2/2007 |
| WO | WO-2007/064429 A1 | 6/2007 |
| WO | WO-2007/073966 A1 | 7/2007 |
| WO | WO-2007/113722 A1 | 10/2007 |
| WO | WO-2008/019246 A2 | 2/2008 |
| WO | WO-2008/121864 A1 | 10/2008 |
| WO | WO-2016/097372 A1 | 6/2016 |

OTHER PUBLICATIONS

Written Opinion for International Application No. PCT/EP2016/058569 dated Jul. 14, 2016.

International Preliminary Report on Patentability for International Application No. PCT/EP2016/058569 dated Jul. 24, 2017.

International Search Report and Written Opinion dated Mar. 31, 2016 issued in corresponding International Application No. PCT/EP/2015/080883.

"Identification cards—Recording technique—Part 2: Magnetic stripe—Low coercivity." International Standard ISO/IEC 7811-2:2001, Third edition, Feb. 1, 2001 (pp. 1-21).

U.S. Office Action dated Jul. 22, 2019 for corresponding U.S. Appl. No. 16/109,056.

Chinese Office Action dated Nov. 5, 2019 for corresponding Chinese Application No. 201580073277.

* cited by examiner

DEVICE FOR OUTPUTTING A MAGNETIC FIELD AND A METHOD OF OUTPUTTING A MAGNETIC FIELD

CROSS-REFERENCE TO RELATED APPLICATIONS

This application is a national phase under 35 U.S.C. § 371 of PCT International Application No. PCT/EP2016/058569 which has an International filing date of Apr. 18, 2016, which claims priority to European Patent Application No. 15164117.2, filed Apr. 17, 2015, the entire contents of each of which are hereby incorporated by reference.

The present invention relates to a device for outputting a magnetic field and a method of outputting a magnetic field and in many aspects to a device and a method where the manner or mode of outputting the magnetic field is selected on the basis of parameters determined.

A large interest exists in developing credit/debit/ID cards with dynamic magnetic stripes which may be turned on/off and which may output the desired magnetic field only when this is desired. Also, cards of this type may be brought to emulate one of a number of cards, so that a more generic card may replace today's large number of cards issued to the same person (membership cards, ID cards, debit/credit cards, access cards, loyalty cards or the like).

As simple as this may seem, a number of problems have been identified, which relate to e.g. the interference of different card readers with the field emitted and therefore the compliance of the card with the different types of card readers. Also, timing from a detection of the card in the card reader to a desired time of outputting of the magnetic field, so that it is detected correctly, may be a challenge. In addition, it has been found that the decoding of the magnetic field in different card readers, to derive information from the magnetic field sensed, may vary from reader to reader. Also, different readers have different reader heads having different parameters which may be taken into account.

Outputting of magnetic fields may be seen in e.g. U.S. Pat. Nos. 3,894,275, 8,103,881, 8,499,334, 2004/0035942, 2010/0265037, 2002/0043566, 2002/0003169, 9,016,584, 2005/0001711, 7,337,326, 8,015,592; 8,082,575 and 4,051,499.

A first aspect of the invention relates to a method of outputting a magnetic field from an outputting element to a reading device, the method comprising:
  determining one of a plurality of outputting modes,
  outputting, from the outputting element, the magnetic field in accordance with the determined outputting mode.

A second aspect of the invention relates to a method of outputting a magnetic field from an outputting element to a reading device, the method comprising the outputting element:
  outputting a first magnetic field to the reading device in a predetermined mode of a plurality of outputting modes,
  sensing one or more parameters,
  determining, based on the parameter(s) sensed, another mode of the plurality of outputting modes, and
  outputting, subsequent to the determining step, a second magnetic field in accordance with the determined outputting mode, the first and second magnetic fields representing the same information.

A third aspect of the invention relates to a method of outputting a magnetic field from an outputting element to a reading device, the method comprising the outputting element:
  outputting a first magnetic field to the reading device in a predetermined mode of a plurality of outputting modes, the predetermined mode being a mode wherein the magnetic field is output from a first number of tracks of the outputting element,
  sensing one or more parameters,
  determining, based on the parameter(s) sensed, another mode of the plurality of outputting modes, and
  outputting, subsequent to the determining step, a second magnetic field in accordance with the determined outputting mode, the second mode being a mode where the second magnetic field is output from a second number of tracks of the outputting element, the first and second numbers of tracks being different numbers of tracks.

A fourth aspect of the invention relates to a method of outputting a magnetic field from a card-shaped outputting element to a reading device, the method comprising the outputting element:
  receiving an input from a user and determining, based on the input received, one of a plurality of outputting modes, and
  outputting the magnetic field in accordance with the determined outputting mode.

In this manner, the user may enter information relating to a reader type (gas station, super market, dip reader, motorized reader or the like) whereby the mode determined may be adapted to the type of reader identified or indicated. It is noted that the plurality of outputting modes may all represent the same information, such as credit card information, or may have at least a portion thereof which is common to all modes.

A fifth aspect of the invention relates to a method of outputting a magnetic field from an outputting element to a reading device, the method comprising the outputting element:
  outputting a first magnetic field, representing first information, to the reading device in a predetermined mode of a plurality of outputting modes, the predetermined mode being a mode wherein the magnetic field is output from a first track of the outputting element,
  subsequently outputting a second magnetic field, representing the first information, to the reading device in a second mode of the plurality of outputting modes, the second mode being a mode wherein the second magnetic field is output from a second track, different from the first track, of the outputting element. In this context, the magnetic field may vary over time. Usually, the magnetic field will represent information and vary over time in a particular manner from which the information may be derived. A preferred manner of having a magnetic field represent information is encoding the information with the F2F encoding format, whereby the magnetic signal will have peaks and valleys representing a sequence of binary "0"s and "1"s representing the information.

The magnetic field is output from the outputting element. Usually, a magnetic field is generated by feeding e.g. one or more coils with an electrical signal, where the magnetic field will have a direction and strength defined by the electric signal, coil parameters and winding direction. Also, a desired variation in the magnetic field may be obtained by varying the electrical signal. This is well known to the skilled person.

The outputting element may comprise a number of other elements, as will be described further below, such as a battery, sensors, controller, storage and the like.

The reading device may be any type of device able to receive a magnetic field. The reading device may e.g. comprise its own coil or a Hall sensor, for example, which may receive the magnetic field and output a corresponding electrical signal for further processing. Usually, the reader is configured to receive the magnetic field and decode this to obtain information encoded therein, when a varying magnetic field is received.

According to aspects of the invention, one of a plurality of outputting modes is determined. One outputting mode may differ from another in a variety of manners. Usually, however, at least a part of any information encoded in, and to be output via, the magnetic field will be the same in all modes. It is noted that in e.g. credit cards, several tracks may be present each outputting separate information. In one mode, only one such track may be used, whereas in another mode, multiple tracks may be used, one of which usually is that used in the first mode. Usually, a track, if operated, will output predetermined information. Thus, operating the first track, the same, first information is usually output. If a first and a second track are operated simultaneously, the output information or magnetic field could comprise the information from both the first and second tracks.

In one situation, however, it may be desired to output predetermined information, such as the usual track 1 or track 2 information of credit/debit/ID/Access cards, but to output this information from another track than usual. As mentioned below, situations exist where, for example, a reader head is imperfect, such as when a reading coil is displaced or rotated therein. In such situations, it has advantages not feeding the magnetic field into the coil of the reader head from directly below the coil or reader head but more or less from a side thereof. This may be achieved by outputting the desired information from a track which is displaced from the track directly below the coil/head to which this information is intended.

Thus, in one mode, the desired information may be output by a first of a number of tracks, where in another mode, such as after having detected a parameter, received an input or detected that a correct detection of the magnetic field has not taken place, another mode may be used where the same information is output by another of the tracks. The magnetic fields output in the two modes may be the same except for the fact that they are output by different tracks. Naturally, this aspect of the invention may be combined with any of the other aspects, features and embodiments of the invention, such as the manners of and elements for outputting magnetic fields etc.

Thus, preferably, the magnetic field to be output represents information determined before the mode is determined, so that the magnetic field represents this information and is output in accordance with the mode selected. Therefore, the method may comprise the steps of firstly determining a first of the modes and outputting a first magnetic field in accordance with the first mode and secondly determining a second of the modes and outputting a second magnetic field in accordance with the second mode, where the first and second magnetic fields represent the same information.

Thus, the information to be output may be determined as well as the encoding (the definition of the valleys/peaks and e.g. a timing thereof; bitrate), where after the mode may be determined according to which the magnetic field is then output.

In general, parameters or characteristics of reading devices may be the presence of interfering materials (magnets, metals and/or paramagnetic materials), the use of a particular type of reader head, a number of heads, the presence of a particular sensitivity problem, a particular type of detection circuit for decoding the magnetic signal or the like. Different modes may be aimed at solving problems caused by or catering for each of these parameters/characteristics or groups thereof.

Modes thus may differ in field strength and/or phase, such as over time, of the magnetic field, the timing in outputting of the magnetic field, which one(s) of a plurality of coils are selected to output the magnetic field and particular manners of varying which coil(s) output the magnetic field over time. Different modes may differ by the angle between the magnetic field lines at and/or in relation to a central axis of a coil or head/sensor of the reading device. Different modes may be suitable for use in different readers or with different reader parameters. Different readers may have reader heads which differ in a manner so that the direction of the magnetic field output from the outputting element toward the reader head may be desired different. The magnetic field output of a coil will have field lines parallel with a symmetry axis of the coil at a centre of the coil but gradually larger angles from this direction farther from the centre. Thus, different angles of the magnetic field lines may be obtained by selecting a particular position in relation to the coil, and different angles and thus different positions may suit different readers.

The outputting step comprises operating the outputting element, typically a field generating element thereof, to output the magnetic field with the parameter(s) of the determined mode.

Preferably, the outputting element has outer dimensions as a standard ID/credit/debit card, such as is defined in ISO/IEC 7810 ID-1: 85.60×53.98 mm, with a typical thickness of 0.76 mm, as is the most widely used dimension for banking and ID cards. The present outputting element thus preferably is a flat, thin, rectangular card configured to be received in ATMs and other card readers used for entrance control, funds transfer, banking operations, cash withdrawal, payment for goods and services, and the like. The card readers may be swipe type readers where a user is requested to swipe the card through a slit, inside which a card reader head is positioned, or readers configured to receive a card into a slot of a housing comprising a reader head. The card may be manually inserted and retrieved from the housing, such as the so-called insert readers or dip readers, or this may be handled by motor operated rollers, etc.

The present outputting element preferably is bendable and fulfils other requirements set out in ISO/IEC 7810 ID-1, such as the bendability and dimensional stability. This standard also relates to flammability, toxicity, resistance to chemicals, resistance to deterioration from exposure to light and heat, as well as the durability of the card. Naturally, these requirements are also desired fulfilled, but such demands may differ from situation to situation, whereby such requirements may not always be required fulfilled.

Naturally, other shapes or dimensions may be selected outside this standard, which is widely used but in no way a limitation to the invention. Thus, outputting elements of other shapes, such as square, triangular, circular, oval and with other thicknesses and other dimensions are equally useful in accordance to the invention.

The outputting element or card is configured to provide a magnetic field, preferably at or on the surface and along a curve on or at the surface of the outputting element. The preferred intention is to emulate, to the largest possible extent, the operation of an old-fashioned credit card when a reader head is translated along the curve. However, differences exist. For example, the present field of the outputting element need not vary along the curve. Instead, the field may be made to vary over time, so that a reader head, stationary or moving in relation to the card, may detect a varying magnetic field. In some embodiments, as will be described further below, the same signal and field is output over all of the curve at any point in time. Thus, the actual position of the reader in relation to the magnetically conducting material may be irrelevant or of little relevance. In other embodiments, the field may be output, over time, from different parts of the outputting element, and these parts may be selected in accordance with a sensed or estimated position of the reader head.

The position and other parameters of this curve are described below.

The preferred positions of this curve or track are defined in e.g. ISO7811-2 or JIS II in relation to cards with the dimensions as defined above. The position of the outputting of the magnetic field may be selected in accordance therewith. This position is not necessarily illustrated on the card/outputting element and may or may not be seen as a predetermined set of positions on the surface of the card/outputting element.

In one embodiment, the determining step comprises outputting a first magnetic field to the reading device in a predetermined mode of the plurality of modes, sensing one or more parameters and basing the determination on the parameter(s) sensed, the outputting step comprising outputting, subsequent to the determining step, the magnetic field in another mode of the plurality of modes.

In this embodiment, the first field output may cause an effect or reaction, such as the opening of a shutter or closure, in the reading device which may be sensed in the sensing step. One such reaction may be the reading device allowing the outputting element to be exposed to a reader head, the presence, velocity, position, acceleration or the like thereof may be detected or sensed and used as the parameter on which the determination of the other mode according to which the magnetic field is output subsequently.

Some types of readers expose a card to either multiple reader heads or the same head multiple times. Thus, a card or outputting element may, as a default action, output the magnetic field in a default manner when sensing either a first reader head of a plurality of heads or sensing the reader head the first of a plurality of times. A subsequent sensing of a second reader head or the second sensing of the same head may then trigger the outputting of the magnetic field in accordance with the other mode.

This other mode may be selected or determined based on parameters of the detection of the second reader head or the second detection of the reader head, such as a direction of movement of the reader head in relation to the outputting element and/or compared to a direction of movement of the first reader head or the first detection of the reader head. If the directions are the same, one mode may be used, and, if they are opposite to each other, another mode may be used. The difference between the two situations may indicate different properties or different types of reading devices, and the two modes may be selected accordingly.

In addition or alternatively, a particular mode may be selected when a relative movement between the card or outputting element and reader head is halted while the reader head is over or in the vicinity of the card/outputting element. This may be seen in e.g. motorized readers having a slot for receiving the card and where the card is temporarily stopped to allow a door or shutter to open to allow the card into the reader. Here, the movement may be halted while the head is above the card. This stopping may be detected and be used for selecting a mode suitable for that type of reader.

In another situation, as is seen in dip/insert readers, the movement may be halted when the card is at the bottom of a slot of the reader, where the reader head may rest on an edge of the card.

When a stopped or halted motion is detected, another signal, according to the determined mode, may be output from the card/outputting element immediately, after a predetermined pause, or it may be output when a movement is again detected or the next time a reader head is detected. Further below, an embodiment is described where also the direction of movement of the reader head may be taken into account when determining the mode and/or the information to output. If the reading device has multiple reader heads, each reader head may be sensed multiple times by the outputting element. Thus, subsequent to the outputting of the magnetic field in the other mode, yet another head may be sensed. It may be one of the already sensed reader heads or a third reader head. This head may be ignored, or the magnetic field may again be output. This may be in accordance with the other mode, the first mode or a third mode of the plurality of modes.

In one embodiment, the determining step comprises sensing a number of reader heads of the reading device and determining the mode on the basis of the number of heads sensed. This is already described above, where the difference between a reading device having two heads and one having one head is illustrated.

A number of different modes or parameters of the reading device may be sensed/determined/used. In one situation, the determining step comprises estimating a distance between two or more sensed reader heads and determining the mode on the basis of the distance estimated. This distance may be characteristic for a reading device or a type or class of reading devices, such as reading devices of a particular model, range or from a particular supplier. The mode selected on the basis of the distance need not have anything in particular to do with the actual distance, but the distance may be specific for reading devices with particular parameters or characteristics to which the mode selected is aimed.

In one situation, the determining step comprises determining, for one or more sensed reader heads, a direction of travel of the reader head(s), in relation to the outputting element, and determining the mode on the basis of the direction(s) determined. Sensing two heads moving in the same direction of travel indicates that the reading device has multiple heads. Sensing two heads moving in opposite directions indicates that the reading device may be an insert or dip reader and that it is the same head which is sensed twice. Often, insert/dip readers use different reader head types than motorized two-head readers. Also, insert/dip readers often have much less metal in the vicinity of the card. In insert/dip readers, the second passage of the reader head (withdrawal of the outputting device from the reader) is often the best reading situation, as the velocity of travel of the reader head past the outputting element is often more even. Many insert/dip readers perform only a reading/sensing of the magnetic field during this withdrawal.

In one situation, the determining step comprises sensing the reader head(s) at different positions of a surface of the outputting element. Then, the determining of the mode may be made on the basis of a comparison between a period of time elapsed between two successive sensings of a reader head and a predetermined maximum period of time. This elapsed period of time may be used for a number of purposes. It may be used as an estimate of a distance between the reader heads and thus as an estimate of a sensor/reader type. Alternatively, it may give an indication of whether the reader heads travel, in relation to the outputting element, with a constant velocity or whether the movement has stopped. A stopped movement may mean that an outputting of the magnetic field should be stopped and potentially resumed or repeated—immediately, after a predetermined period of time or upon a subsequent sensing of a reader head. The elapsed period of time may be compared to an estimated maximum period of time within which a next sensing of a reader head is expected, if the travelling is at a constant velocity, for example.

In one embodiment, the determining step comprises determining a number of parameters of the reading device, comparing the parameters with parameters stored in the outputting element and determining the mode on the basis of the comparison, such as the result of the comparison. Any of the parameters described may be used, as may any combination thereof. In fact, a "fingerprint" of a reader may be generated from a set of such parameters. Such "fingerprints" may be stored in the outputting element together, for example, with information identifying a mode which is particularly suited for a reader corresponding to the "fingerprint".

Below is described how "fingerprints" may be stored, learned and exchanged between outputting elements and readers and a central server if desired.

In one embodiment, the determining step comprises initially determining or sensing a deformation of the outputting element and determining the mode on the basis of the deformation.

This deformation may be caused by the reader when the outputting element is inserted or introduced therein. The deformation may be caused by the outputting element being transported (and thereby potentially compressed/bent) by rollers and/or impacting on internal surfaces of the reader.

Also, the deformation may reveal vibrations of the reader, such as resonance frequencies thereof. This indicates which materials are used in the reader and thus may also be used in the determination of reader type or the mode (see also below).

The deformation may differ depending on a number of rollers, the relative position of rollers, the surface thereof (roughness, diameter, imperfections, circularity), the material (e.g. hardness) thereof and the like. Such deviations from a perfect tubular surface may be seen as repetitive deformations along the element during transport.

In one embodiment, the determining step comprises receiving radiation from the reading device and determining the mode on the basis of the radiation received. A radiation receiver may be provided for receiving radiation after e.g. detection or sensing of the reader and/or head. This radiation may stem from other parts of the reader and thus be characteristic of the reader and/or the type/class of reader. The radiation may have been reflected off parts of the reader again providing a characteristic parameter. Naturally, the outputting element may have a radiation outputting element, such as an LED/OLED/laser diode or the like, for emitting radiation toward (into) the reader, if there is not sufficient radiation without.

In one embodiment, the determining step comprises sensing vibrations (such as sound) from surroundings of the outputting element (such as the reading device) and determining the mode on the basis of the vibrations sensed. The vibration determination may be caused by the effects mentioned above in relation to the deformation but also from e.g. a motor. Instead of determining deformation of the outputting element, vibrations of the outputting element or of the reader may be determined, such as by sensing sound emitted from vibrating elements. The sound detector may be of the same type as deformation detectors, in addition to microphones, acceleration detectors, piezo electric elements and the like.

In one embodiment, the determining step comprises sensing a presence (or an amount) of a metal and/or a paramagnetic or dielectric material and determining the mode on the basis of whether the metal/paramagnetic/dielectric material is present or not. This amount or this presence may also aid in determining in accordance with which mode to output the magnetic field. Sensors suitable for this type of sensing may e.g. be capacitive or inductive sensors.

One manner of sensing metallic/paramagnetic and/or dielectric materials is to have the outputting element output a magnetic field while sensing, using a sensor, a resulting magnetic field. This field will be affected by the presence of metals and/or paramagnetic materials and dielectric materials and this effect may be determined and used as the parameter or characterization of the reader type.

Suitable sensors are coils or Hall sensors. It is noted that coils directed with their symmetry axes (extending through the windings of the coil) directed in different directions will be able to determine different parameters (directions of the field lines of magnetic fields). Thus, a mix of different directions may be desired, such as at least two coils having non-parallel symmetry axes, such as axed differing by at least 20, such as at least 30, such as at least 50, such as at least 60, such as at least 75 degrees.

In one embodiment, the determining step comprises determining an acceleration or a velocity of, and/or a variation of the velocity/acceleration, of the card/outputting element in relation to the reading device and determining the mode on the basis of the acceleration, velocity and/or variation determined. Firstly, the velocity/acceleration and/or variation may be used for characterizing a reader type and thus aid in determining a suitable mode.

Secondly, this determination may be used in general for selecting a mode where an information density (e.g. bits per second; bit-rate) may be adapted to a velocity of the outputting element in relation to the reader. Naturally, if the velocity is increased, it may be desired to increase the bit-rate to ensure that all desired information is output during the reading. Also, if it is known or assumed that a reader is not able to receive a bit-rate above a certain maximum limit, a mode may be selected which does not exceed this limit.

In general, the detection or quantification of parameters of the reader may be performed a single time or may be performed over time, such as during transporting of the outputting element in relation to the reader. This determination over time may aid in determining a diameter of a roller, a shape of a roller, a distance between rollers, a distance between reader heads as well as a distribution of e.g. metallic elements or other disturbing elements along the path taken by the outputting element in relation to the reader. Also, a bit rate may be adapted during the reading, as the velocity may change and thus require an adjustment of bit-rate.

In one embodiment, the determining step comprises the outputting element receiving an input from a user, where the determination of the mode is based on the input received. Naturally, the user may inform the outputting element what mode to be in. In existing cards with dynamic magnetic strips, users may inform the card as to which of the user's cards to emulate (if the user has a VISA® card, an AMERI- CAN EXPRESS® card, a MASTERCARD ®, a loyalty card to a petrol supplier, a loyalty card to an airline, an identity card, a hotel room card key and the like). Thus, the information output in the magnetic field may be altered by the user. Different modes thus may output different information.

The user may determine the type of reader or context and enter corresponding information into the outputting element. A motorized reader may be distinguished from an insert/dip reader and a swipe reader, and corresponding information may be entered.

Additionally, the user may select a certain mode after a number of unsuccessful attempts using another mode. Alternatively, the outputting element may itself detect the number of unsuccessful attempts and select another mode or try different modes until one succeeds (or no more heads are sensed).

A selectable mode may be a mode wherein only a single track on a multi-track outputting element is used, which is the most basic and simple type of information transfer with the least amount of interfering signals.

The entering of information into an outputting element may be obtained in any desired manner. Sometimes switches, such as dome switches, may be provided. Touch sensitive areas of the outputting element may alternatively be used for this information entering. Other types of interfaces, such as wave sensing, gesture sensing, voice command detection, fingerprint sensors, wireless interfaces communicating with other elements, such as a cell phone, pad or the like, may be used. Also, a deformation sensor may be used for sensing user generated deformation of the outputting element (bending, tapping against a surface or the like), where the nature or quantity of the deformation may be used for distinguishing between desired modes.

In one embodiment, the determining step comprises the reading device outputting information and the outputting element receiving the information and basing the determination on the information received. The reader may output this information in the form of an optical signal, such as the overall reduction in ambient light when the outputting element is enclosed in a motorized reader, a magnetic field, an electric field, an electric signal, a vibration, a sound, a contacting of the outputting element or the like. This information may specifically indicate the best mode for the particular reader and may be picked up by the outputting element and used for selecting the mode.

In one embodiment, the outputting element has a plurality of coils positioned sequentially along a predetermined curve in the outputting element or on a surface thereof.

In this context, a coil is an electrical element configured to receive an electrical signal and output a corresponding magnetic field. "Corresponding" in this situation may be the outputting of a magnetic field varying in the same manner as the electrical signal, such as a current/voltage thereof. Often a coil is a coiled electrical conductor. A coil may be a flat coil or a helical coil, for example. Also, combinations of such coil structures may be used.

It is noted that a coil may be used for both outputting the magnetic field and sensing a magnetic field. This sensing and outputting may be performed simultaneously, or a sensing head may be sensed before the coil is used for outputting a signal to the sensing head. This is described in the Applicants co-pending application filed on even date and with the title "A METHOD AND AN ASSEMBLY FOR GENERATING A MAGNETIC FIELD AND A METHOD OF MANUFACTURING AN ASSEMBLY" (PCT/EP2015/080663) and which is incorporated herein by reference.

A coil may comprise therein a core material configured to guide the magnetic field generated by the coil.

The surface may be an outer surface of a flat or plane element, directed toward surroundings of the element. If the element is card-shaped, the outer surface may be one of the two major surfaces of the card.

In this context, the element, as is described above, may have the shape of a credit card or ID card. Hitherto such credit cards, access cards or ID cards often have had static magnetic strips of magnetisable material on to which one or more magnetizing signals has/have been applied so that the strip represents a number of separate magnets together forming one or more signals when read by a reader head.

The coils are arranged at least substantially along the curve. The curve is predetermined and preferably is straight but may have any shape, such as a bent shape, a sine-shape or the like. In a preferred embodiment, such as where the assembly is credit-card shaped, the curve and thus the coils are provided so as to provide a magnetic field along a track of a magnetic card. This track and the position thereof may be seen in ISO 7811-4. As is described below, the coil(s) may be offset up to 1, 2, 3, 4, 5, 6 or 7 mm, but often less, from this track position, when projected on to the outer surface, as this may provide a better angle for the magnetic field to enter a reader head travelling directly over the track.

The outer surface may be bounded by at least a first and a second edge portion. The edge portions may be opposing edge portions and may be part of edges defining between them the outer surface. The edges may be the oblong surface parts of a card defining the total outer surface of the card together with the two main sides. An edge may also be the interface between two surface parts at an angle to each other. Edges may be sharp, such as between two plane surfaces perpendicular to each other, or may be soft, such as rounded.

The curve may have a first length and may extend between a first and a second points on the surface, the first point being positioned within a first distance of 20% of the first length or less from the first edge portion and the second point being positioned within a second distance of 20% of the first length or less from the second edge portion.

In one embodiment, the coils are at least substantially equidistantly positioned along the curve, such as between the first and second points. The coils may be provided in a single row of coils. In this context, a position of a coil may be a centre thereof. This centre may, if desired, be projected on to the outer surface.

In one embodiment, a first coil is positioned within 25% of the first length from the first point or the first edge and a second coil is positioned within 25% of the first length from the second point or the second edge. Thus, coils are preferably positioned so close to the first and second points that a magnetic field may be sensed also at the first/second points.

Usually, the coils may be fixed to other parts to form a unit, such as a card. This attachment may comprise lamination, gluing, welding/soldering or the like.

The first and second edge portions may be opposite to each other. Preferably, the outer surface has a longest dimension, where the first and second edge portions are provided at either end of the surface along this dimension.

The first and second edge portions may be positioned with a distance there between of 1-30 cm, such as 2-20 cm, such as 5-10 cm, if desired.

The outer surface may be plane or bent, height stepped, and/or embossed, for example. Preferably, at least a plane surface is provided so that a plane movement of the assembly in relation to e.g. a reader head will facilitate detection of the magnetic signal.

Any number of coils may be used, such as 2, 3, 4, 5, 6, 7, 8, 9, 10, 12, 14, 15, 16, 18, 20 or more coils. The coils may be operated or controlled individually, or sets of coils may be defined and controlled/operated simultaneously (see EP14199442.6 and Applicants co-pending application filed on even date and titled "A method and an assembly for generating a magnetic field and a method of manufacturing an assembly"—PCT/EP2015/080663) The sets may comprise different numbers of coils but preferably have the same number of coils.

The curve may extend from the first to the second edge portion but may be desired to not extend all the way to the actual edge portions. Thus, the coils may not need to extend all the way to the edge portions.

The length of the curve, the first length, may be 80% or more of a distance between the first and second edge portions. Thus, in the credit card embodiment, the first length may be the majority of the width of the card. In cards according to ISO 7810 ID1 and ISO 7811-4, the width is 85.6 mm.

The first point and the second point define end portions of the curve and may be defined on the outer surface. Naturally, the first and/or second points may be positioned closer to the edge portions, such as 15% or less, such as 10% or less, perhaps 9% or less, such as 8% or less, such as 7% or less, such as 5% or less of the first length. In one embodiment, a reason for not having the points or the coils too close to the edges is that sensors may be desired between the outer-most coils and the edge portions.

The coils may be provided on the surface of the assembly but are preferably provided inside the assembly, such as within 400 μm, such as within 300 μm, such as within 200 μm, such as within 100 μm from the surface. In the embodiment where the assembly is credit-card shaped, for example, the overall thickness of the assembly, or at least a plan part thereof (excluding e.g. any embossed portions) may be less than 1 mm, such as less than 900 μm, such as between 850 μm and 700 μm, as is seen in ISO7810, whereby the coils may be provided quite close to the surface.

One outputting mode may be a mode wherein only a part of the coils are operated simultaneously. In an interesting embodiment, the operated coils are comprised in a group of coils being a plurality of neighbouring coils along the sequence. It is noted that within a group of coils, some coils may be operated, and thereby output a magnetic field, and others not. Not operated coils may be short circuited if desired.

In a group of coils, preferably the extreme coils, along the curve and in the sequence, are operated. Different modes may relate to different numbers of coils in a group as well as which coils in the group are operated simultaneously and which are not. The pattern, from one end of the sequence of coils of a group, of operated and not operated coils, may be chosen depending on the type of coil used, the type of reader or reader head used.

It is particularly interesting when one outputting mode is a mode where a position of a reader head of the reading device, in relation to the outputting element, is determined and the coil(s) operated is/are selected so that the determined position has a predetermined relationship with respect to a predetermined coil of the operated coils or groups of coils.

In this situation, the position in relation to the curve or a position along the curve may be determined. In this manner, the position in relation to the coils may be determined and thus the effect on a magnetic field output by one or more coils on the reader head in that position.

The predetermined relationship in relation to a coil may be a positional relationship, such as whether the reader head is above, to the side of (viewed along the curve), ahead of or behind the coil.

This is especially relevant when the operated coils, such as the pattern of the group, is/are shifted along with the reader head moving along the curve. Thus, the desired position of the coils, relative to the reader head, may be maintained when the reader head moves along the curve, by shifting the operated coils along the curve. These positions may be determined when the reader head/coils are, for example, projected on to a plane of a surface of the outputting element, such as an outer, major surface of a card.

This row or group of coils may then be shifted in order to obtain a sequential operation. In one example, a group of 5 coils is defined, where the central coil is not operated but the remaining 4 are. The sequential operation thus is the "movement" of this pattern (on, on, off, on, on) sequentially through the coils. A coil may thus firstly be inactive, then active for two periods of time, then inactive for one period of time, active again for two periods of time and finally inactive, as this pattern moves along the sequence of coils. Thus, the first "on" is sequentially shifted along the coils, as is the second "on", the "off", the third "on" and the fourth "on". The pattern thus is moved along the sequence of coils and in the same direction as the reader head.

The overall effect of this is that when the group of coils generate a particular magnetic field, this field may be shifted along the sequence of coils with the reader head. Thus, if it is desired to generate a particular magnetic field to the actual reader head, this is possible.

By selecting the coils to be operated and their position in relation to the reader head, it is possible to tailor e.g. the angle between the magnetic field in or at the reader head, such as in relation to a symmetry axis of a coil in the reader head. It has been found that different reader heads have coils with different axes in relation to the intended swiping plane of the cards. Thus, different angles of the generated magnetic field may be desired for different heads. Different modes may therefore be defined.

In one situation, the outputting step comprises selecting and operating a group of neighbouring coils defining an overall length. This length may be between extreme ends of the extreme coils of the group or between centres thereof. Then, the coils of the group may be selected so that the determined position of the reader head is within 25% of the length from a centre of the group of coils. Thus, the reader head may be directly above a central coil of the group of coils or above or between the 2 or 3 central coils of the group.

Above a coil, in this context, may be that a straight line perpendicular to the surface of the outputting element (at the coil) extends through the coil and the reader head.

At this position, the magnetic field may be made more or less parallel to the surface of the outputting element. This type of magnetic field is very suitable for a reader head having a coil which is parallel to the surface of the outputting element during swiping. Naturally, imperfections occur, and the coil may have an axis which is ±25 degrees from parallel with the card surface, for example, without the angular deviation having a too detrimental effect.

The closer the reader head is to the end of the group of coils, such as the outermost operated coil or even on an outer side thereof, the more may the magnetic field lines deviate from parallel with the surface. In one situation, the group of coils are selected so that the determined position of the reader head is no less than 10%, such as no less than 20%, such as no less than 30% of the overall length from a centre of the coils of the group. Preferably, the reader head is at or above an extreme coil in the group of operated coils, between that coil and an adjacent/neighbouring coil or actually outside the extreme coil.

Thus, the closer the reader head is to the end of the group, the higher may the angle of field lines be to the plane or surface of the coils, and this may cater for heads having a sensing coil having an axis with a large angle to this plane.

In a particular embodiment, a mode with this feature (selecting coils below and/or to only one side of the reader head) may have the additional feature of altering between a mode where coils are selected below and/or to only one side of the reader head and a mode where coils are selected only below and/or to another side of the reader head (along the curve). When altering between the two modes, the magnetic field output from the selected coils is phase reversed, as the field lines at the outer ends of the selected or fed coils will, even when having the same directions, have different phases. Thus, altering between the modes would, if the magnetic field output is not phase shifted, shift the phase of a signal output of the reader head, which could cause an erroneous interpretation of the magnetic signal received. This phase reversing of the magnetic field may be obtained by phase reversing the signal fed to the coils in one of the modes compared to the other.

An advantage of this mode is that a longer portion, if not all, of the length covered by the coils may be used for outputting the magnetic field. This is particularly interesting when a longer length is desired in order to e.g. reduce a bit rate output by the magnetic field. Thus, this mode may be selected if a high swipe velocity is detected, if re-readings are detected or if a reader type is detected which is known to require a relatively lower bit rate than other sensors.

Thus, different modes may be defined where the reader head has different positions in relation to the coils in the group, and these different modes may have different angles between the magnetic field lines and the plane of the coils or the swipe, so that different angles of sensing coils of the reader heads may be adapted too. Naturally, a completely different mode may be one wherein the outputting mode is a mode wherein all the coils are operated simultaneously.

Another type of mode may be a mode wherein a position of a reader head of the reading device is determined, in relation to the outputting element, such as the curve, and an amplitude of the magnetic field is determined from the position determined. In this manner, any sensitivity differences or variation along the outputting element may be compensated for. A reader head, if travelling across or over the surface of the outputting element, may experience a variation in sensitivity either due to e.g. a difference in angle between a coil of the reader head and the magnetic field lines, a distance between the reader head and the outputting element may vary or the like. Such sensitivity differences may be compensated for. Naturally, another type of compensation would be to select and operate suitable ones of the coils so that an angle of the resulting field lines will suit the actual position of the reader head when not positioned perfectly over the curve.

In some instances, where the reader head moves over a curve of the outputting element, the amplitude may be increased from an initial position along the curve to a later position. In another situation, the amplitude may be reduced. In some situations, the amplitude may be desired higher at a centre of the curve and in yet other situations, the amplitude is desired lower at the centre than at the ends.

In one embodiment, a first and a second outputting mode may be modes wherein the magnetic field represents a digital signal, where the first mode is a mode wherein a bit rate of the magnetic field is a first bit rate and the second mode is a mode wherein the bit rate of the magnetic field is a second bit rate. The first bit rate may be larger than the second bit rate. The first bitrate may, for example, be an integer times that of the second bit rate, such as twice the second bitrate.

In one embodiment, multiple tracks are provided. Thus, coils are provided along a plurality of parallel tracks and different information may be output from each track, preferably simultaneously. One or more of the tracks may each be embodied as described above with one or more coils configured to output the field/information of the track. Thus, when different numbers of tracks are used, different information may be output, even though the same track may output the same information in two different modes. In this respect, one or more sensors may be provided (if transmitting coils are not used) for each track. In this manner, it may be determined which tracks to output information from.

The reason for this is that some reader heads are configured to read information from one track, some from two tracks and some from three tracks. It is possible to determine, using a sensor provided at the position of the track, whether the reader head has a sensor coil (usually, the yoke may be sensed as it has a higher magnetic conductivity than the remainder of the reader head) at that particular track. In this manner, a mode may be selected, once the reader head and which tracks it is configured to read is detected.

In a sixth aspect, the invention relates to an outputting element comprising:
  one or more field generators configured to output a magnetic field,
  a controller configured to determine one of a plurality of outputting modes and control the one or more field generators to output a magnetic field in accordance with the determined outputting mode.

A seventh aspect of the invention relates to an outputting element comprising:
  one or more field generators configured to output a magnetic field,
  one or more sensors, and
  a controller configured to:
    control the one or more field generators to output a first magnetic field in a predetermined mode of a plurality of outputting modes,
    receive, from the sensor(s), one or more parameters sensed,
    determine, based on the received parameter(s), another mode of the plurality of outputting modes, and
    control the one or more field generators to output a second magnetic field in accordance with the determined outputting mode, the first and second magnetic fields representing the same information.

An eighth aspect of the invention relates to an outputting element comprising:
  one or more field generators configured to output a magnetic field in one or more tracks,
  one or more sensors, and
  a controller configured to:
    control the one or more field generators to output a first magnetic field in accordance with a predetermined outputting mode of a plurality of outputting modes, the first magnetic field being output from a first number of the tracks, receive, from the sensor(s), one or more parameters sensed, determine, based on the received parameter(s), an outputting mode of the plurality of outputting modes, and control the one or more field generators to output a second magnetic field in accordance with the determined outputting mode, the second magnetic field being output from a second number of the tracks, the first and second numbers of tracks being different numbers of tracks.

A ninth aspect of the invention relates to an outputting element comprising:

one or more field generators configured to output a magnetic field, an input element configured to be operated by a user and output a signal, a controller configured to:

receive the signal from the input element, determine, based on the signal, an outputting mode of the plurality of outputting modes, and control the one or more field generators to output a magnetic field in accordance with the determined outputting mode. A tenth aspect of the invention relates to an outputting element comprising:

a plurality of field generators configured to output a magnetic field a plurality of tracks, control the field generators to output a first magnetic field, representing first information, in accordance with a predetermined outputting mode of a plurality of outputting modes, the first magnetic field being output from a first track of the tracks, determine, based on the received parameter(s), an outputting mode of the plurality of outputting modes, and control the field generators to output a second magnetic field, representing the first information, in accordance with the determined outputting mode, the second magnetic field being output from a second track of the tracks, the first and second tracks being different tracks Naturally, these outputting elements may be combined with any of the other aspects, features and embodiments of the invention and may thus have input elements, controllers etc. Thus, one or more sensors may be provided and/or a user input element, which may be used in the determination of the outputting mode such as to which track to use in the outputting mode.

Usually, one or more first field generators are configured to output a magnetic field from a first track and one or more second field generators are configured to output a magnetic field from another track. Thus, operation of a track could mean operating the field generator(s) for that track. Then, this aspect could be feeding a signal first to one or more first field generators to output the first magnetic field and then feeding the same signal, or another signal representing the same information, to one or more second field generators in order to have the second magnetic field output.

In general, all aspects, embodiments and features may be combined in any manner.

As mentioned above, the outputting element preferably is card shaped with the field generator(s) positioned in the position of the legacy magnetic strip or at least in position(s) where a reader head moving over the position of the old-fashioned magnetic strip will be able to sense the magnetic field output by the field generator(s).

A field generator may be a coil as is described above.

A controller is provided which controls the field generator(s). Usually, the controller is connected to the field generator(s). This connection may be a direct connection from the controller to each field generator or an indirect connection where a signal output by the controller is fed to the pertaining field generator via one or more other elements, such as via one or more other field generators.

The controller may be a software controlled processor, an ASIC, a DSP, an FPGA or the like or a mixture of such elements. The controller may be a single chip or may be formed by a number of chips, such as when different operations thereof are controlled by different chips. Memory on-chip and/or off-chip may be used if desired. The controller may have many other tasks, such as determining which signal, if more signals may be output, to output, the generation of the signals for the coils so that the desired magnetic signal is output, the determination of whether to output the signal or not, such as to prevent fraudulent reading of the magnetic signal.

The controller is configured to determine a mode and control the field generators in that mode. In this context, the magnetic signal usually will represent predetermined information, such as information relating to an identity of a person, a bank account, or the like. This information may be encoded in any desired manner, such as as a binary signal encoded using the F2F signal format which most card readers are configured to detect and decode.

Preferably, the same information is used in all modes, so that the selection of the mode is not a selection of the information to output but the manner in which this information is output, such as how the magnetic field is adjusted while having the same information contents. However, additional information may be output in some modes, as is described above.

Often, a varying (over time) electrical signal is defined or output where the variation represents the desired information as well as a bit rate of the signal, where the different modes then describe or define different manners of outputting a magnetic signal representing the varying electrical signal.

The controller may store or have access to information defining the individual modes. This information may relate to combinations of parameters determined or received from a user and information defining the mode, such as number of coils operated, their position in relation to the reader head, if required, whether phase shifting is required, whether mode altering is required, whether a particular bit rate, such as a maximum bit rate, exists, which tracks, if multiple tracks exist, to use etc. In one embodiment, the outputting element comprises one or more sensors. These sensors may be used for a number of tasks, which are exemplified below. In general, the sensors may be used for sensing input from a user, or parameters of or information from the reader.

The output of the sensors may be used for allowing, in the first place, the magnetic field to be output (if the sensor is a fingerprint reader by which the user may identify him/herself and thereby allow the outputting of the magnetic field) or, in the second place, for controlling the mode in which the magnetic field is output.

The sensors may also sense parameters relating to the reader so as to characterize or identify the reader or the type of reader so that a mode suitable for the reader/type may be selected. A type of reader may, for example, be a reader having multiple reader heads or wherein the outputting element is introduced into and withdrawn from, so that a reader head is experienced twice. Yet another type of reader may be one wherein a reader head is experienced only once.

The sensors may thus sense parameters relating to a relative movement between the reader or a part thereof (typically a reader head) and the outputting element, so that the mode may be selected on the basis of this movement or parameters derivable from the movement.

It is noted that the output of the sensor(s) may not directly identify the reader of reader type, but the reader/type or the desired mode may be derived therefrom, such as by looking up a correspondence of sensor output and reader/type/mode.

In one situation, the controller is configured to:
control the one or more field generators to output a first magnetic field in a predetermined mode of the plurality of modes,
receive, from the sensors, one or more parameters,
base the determination on the parameter(s) sensed, and
control the one or more field generators to output the magnetic field in another mode of the plurality of modes.

As mentioned above, this first outputting of the magnetic field may be required to, for example, provide access to an interior of the reader and another reader head. Thus, the actual mode used for the first magnetic field may not be important if, as is usual, the gaining access is obtained as long as a magnetic field is output.

The parameters received from the sensors may have to do with the sensing of another—or the same—head. The sensing may be the mere presence of a reader head or alternatively also other parameters, such as a direction of movement in relation to the outputting element. This second parameter may be used for distinguishing between readers, and the other mode may be determined in accordance therewith.

In one situation, the sensor(s) is/are configured to sense one or more reader heads of a reading device.

Sensors of this type may be selected from a very diverse group of sensors. Inductive or capacitive sensors may sense the presence of the material of the reader head. Deformation sensors, such as strain gauges, contact switches, piezoelectric elements, may be used for sensing the contact between the reader head and the outputting element. Electrical conductors may be provided on a surface of the outputting element, where the reader head may short circuit these and thereby make its presence known.

Then, the controller may be configured to determine the number of sensed reader heads and determine the mode on the basis of the number of heads determined. Different reader types may have, as one distinguishing feature, different numbers of heads.

Another type of information which the controller may use to characterize a reader and select a mode may be if the reader head stops its motion in relation to the card, such as at a position above the card, as is described above.

One head may be used for sensing a first magnetic field and, when sensing that field, allowing access of a card to an interior of the reader, where a second reader head is used for actually receiving the magnetic field and decoding this to perform the action sought for (withdrawal of cash, opening a door or the like).

In one situation, the controller is configured to estimate a distance between two or more sensed reader heads and to determine the mode on the basis of the distance estimated. Different reader types may have different distances between the reader heads, so that this parameter may be used for determining the mode. This distance may be determined in a number of manners. When the reader heads are translated over the surface of the outputting element, as is seen in most if not all readers, different positions of a reader head may be determined over the outputting element. From a timing between the sensings, a velocity may be determined. From this information, the timing between sensings of the two heads may be used for estimating the distance. Alternatively, if both heads are sensed simultaneously by sensors of the outputting element, such as if the distance is smaller than an extent of the outputting element, the distance may be determined without estimating the velocity.

In one embodiment, the outputting element comprises a sensor configured to sense a direction of travel of a reader head and wherein the controller is configured to receive a signal from the sensor and determine the mode on the basis of the signal received. As described above, different types of sensors may be used. The direction of travel may be determined by using a plurality of the above position sensors and using the timing between individual sensors determining a position of the reader head. Usually, the sensors are positioned in positions of the outputting element at or close to the path where the reader head engages or is the closest to a surface of the outputting element, so that the detection is as reliable as possible. Thus, multiple such sensors along this path may be used for determining the direction of travel. The same set-up may be used for determining a velocity of the travelling. Other sensor types may be accelerometers, optical detection of the type used in computer mice and the like.

In one situation, the sensors are positioned at different positions in relation to a surface of the outputting element and the controller is configured to determine the mode on the basis of a comparison between a period of time elapsed between two successive sensings, by two different sensors, of a reader head and a predetermined maximum period of time. As is described above, the travelling of the reader head in relation to the outputting element may have stopped for any reason. This may be detected when a next sensing of the same head does not occur at the point in time expected. When the positions of the sensors are known and the velocity also, a point in time may be estimated for when a given sensor will detect the reader head. The estimated point in time may be a period of time allowing for variation in the velocity. If the reader head is not sensed within this period of time, the travelling may be stopped and the outputting of the magnetic field may as a consequence be stopped. The mode thus may be a mode where no magnetic field is output, or the magnetic field may be output (in the same or another mode) after a predetermined period of time has elapsed. This may be seen as a resetting of the outputting of the magnetic field.

In one embodiment, the outputting element comprises a storage. Then, the controller may be configured to determine a number of parameters of the reading device, compare the parameters with parameters stored in the storage and determine the mode on the basis of the comparison, such as the result thereof. This may be seen as a fingerprint of the reader. A number of parameters may be determined and used (converted by any desired manner) as a lookup in a table also holding information relating to modes.

In one situation, the outputting element comprises a deformation sensor, wherein the controller is configured to receive a signal from the deformation sensor and determine the mode on the basis of the signal from the deformation sensor. The different types of deformation may be seen further above.

In another situation, the outputting element comprises a radiation sensor, the controller being configured to receive a signal from the radiation sensor and determine the mode on the basis of the signal from the radiation sensor. The radiation sensor may be a radiation sensitive diode, for example. As described above, a radiation emitter may also be used.

In a further situation, the outputting element comprises a vibration sensor, the controller being configured to receive a signal from the vibration sensor and determine the mode on the basis of the signal from the vibration sensor. A vibration sensor may be of the deformation sensor types. Alternative types of vibration/sound sensors are piezo electric elements and microphones.

In yet another situation, the outputting element comprises a sensor configured to sense the presence of a metal, magnet or paramagnetic material, the controller being configured to receive a signal from the sensor and determine the mode on the basis of the signal received from the sensor. Sensors of this type may be inductive sensors, Hall sensors and capacitive sensors.

In one situation, the outputting element comprises a sensor for determining a velocity and/or a variation thereof, of the outputting element in relation to the reading device, the controller being configured to receive a signal from the sensor and determine the mode on the basis of the signal received. A velocity sensor may be a combination of a plurality of position sensors. A velocity may also be sensed from a frequency of a vibration pattern generated by a non-circular roller transporting the outputting element when the diameter thereof is known. Other types of velocity sensors may be an accelerometer or a sensor able to detect the reader head when within a predetermined distance. The period of time where the reader head is detected may then describe the relative velocity.

A very different embodiment is one comprising an input element configured to be operated by a user, the controller being configured to receive a signal from the input element and determine the mode based on the signal received. The user may inform the outputting element of the type of reader or the desired mode by entering corresponding information. Suitable input element types may be touch buttons, dome switches, touch sensitive areas, a wireless or contact-based connection to another element such as the reader, a cell phone, pad, PC or the like on which the user makes the selection and corresponding information is fed to the outputting element via the wireless connection. Also, deformation/vibration sensors may be used, where the user taps or deforms the outputting element in a manner from which the type or mode may be determined. Also other types of detectors, such as voice detectors and/or optical detectors may be used for the user to enter information.

In a particularly interesting embodiment, the outputting element has a plurality of coils positioned sequentially along a predetermined curve in the outputting element or on a surface thereof. Most legacy cards with dynamic magnetic strips have a single, long coil extending over all of the path where the magnetic field is to be output. Alternatively, a number of smaller coils are used for generating single bits of the signal.

By partitioning or dividing the long coil into smaller coils, other, quite different, modes may be obtained. It is possible to determine a particular shape of the magnetic field by operating only part of the coils—and to have this shape follow the movement of the reader head in relation to the outputting element.

In one situation, the controller is configured to determine an outputting mode (i.e. drive the coils in that mode) wherein only some of the coils are operated simultaneously.

The above-mentioned pattern may thus be defined where a group of coils is selected, usually a group of neighbouring coils of which one, more or all are operated simultaneously. The coils of the group does not comprise all coils of the outputting element and when coils of the group are operated, the coils not forming part of the group are not operated. Usually, the two most extreme coils of the group are among the operated coils. One or more coils of the group may not be operated at the same time as the operated coils, so the pattern or group may comprise both operated and not operated coils.

This group or pattern may then be moved along the sequence of coils so that the magnetic field output by the group or pattern may be moved along the sequence of coils.

In one situation, the outputting element comprises a sensor for sensing a position of a reader head of the reading device in relation to the outputting element, such as along the expected path of movement of the reader head (the above-mentioned curve). Thus, the position of the reader head may be tracked and the operation of the coils, the shifting of the magnetic field and the group, may be coordinated therewith.

In one situation, the controller is configured to operate the coil(s) in a mode wherein a predetermined coil of the group of coils has a predetermined relationship to the position sensed. In this context, the predetermined coil may be e.g. the extreme coil along the movement of the reader head in relation to the group of coils, the extreme coil in the opposite direction, a central coil or any other coil along the sequence of coils in the group. Thus, when the position of the coil and thus the group may be determined in relation to the reader head, the manner in which the particular magnetic field output by the group interacts with the reader head may be tailored. The magnetic field often is more parallel to a plane of the coils (such as the surface of the outputting element) at a centre of the group and more perpendicular thereto at the extreme ends of the group.

When the controller is configured to determine a mode wherein a group of neighbouring coils are operated, the group of coils defining an overall length, the position of the reader head may be defined in relation to this length. In this context, the length may be defined by extreme portions of the extreme coils or the group, or centres of these coils.

In one situation, the controller is configured to operate the coils in a mode wherein the determined position of the reader head is within 25% of the length from a centre of the group of coils. At this position, as described, the field may be more or less parallel to a plane of the coils. This mode may be suitable if the reader head has a sensing coil which is also more or less parallel to this plane. This central portion of the group may be where the reader head is above a central coil of the group or above or between two or three central coils of the group.

In another situation, the controller is configured to determine a mode wherein the determined position of the reader head is no less than 30% of the length from a centre of the group of coils. In this manner, the reader head is closer to the extreme ends of the group where the magnetic field lines may be at a larger angle to a plane of the coils, such as perpendicular to the plane of the coils. This mode may be more suited for heads having a sensing coil at an angle to this plane, such as perpendicular thereto.

In this situation, the controller may also alter, as is described above, between one mode where coils are operated only below and/or to one side of the reader head and another mode where coils are operated only below or to the other side of the reader head, where the change in mode also includes a change in direction of the field lines so that the reader head in the two modes sees no change in magnetization direction or phase. The controller may facilitate this change in magnetization direction by reversing the phase or current direction of the signal fed to the coils in the two modes, i.e. the signal fed in one mode would be fed with one phase and the same signal if fed in the other mode would be 180 degree phase shifted.

Naturally, alternatively the controller can be configured to determine a mode wherein all the coils are operated simultaneously so as to e.g. act as a single, long coil.

In many situations, multiple magnetic fields are desired output, one from each of a multiple of tracks. Each such track may be formed by one or more coils as mentioned above. The positions of the tracks and the information output from the individual track is described further above.

In one embodiment, the outputting element comprises a sensor for sensing a position of a reader head of the reading device in relation to the outputting element (such as along the intended path thereof; the curve), wherein the controller is configured to determine a mode wherein an amplitude of the magnetic field is determined from the position determined. Thus, the amplitude of the magnetic field may be determined or varied with the position of the reader head. This has the advantage that any sensitivity variation of the reader head or the assembly of the reader head and the outputting element may be taken into account. This sensitivity variation may be caused by a varying distance between the reader head and the outputting element during the travelling of the reader head over the outputting element. A sensitivity variation may also be caused by interference of other elements, such as metals, magnets or paramagnetic materials during or along the path. In addition, the angle of a symmetry axis of a sensing coil in the reader head and the magnetic field lines may vary over the path, causing a difference in sensitivity or coupling between the field and the coil.

In one embodiment, the controller is configured to determine one of a first and a second mode in each of which the magnetic field represents a digital signal, where the first mode is a mode wherein a bit rate of the magnetic field is a first bit rate and the second mode is a mode wherein a bit rate of the magnetic field is a second bit rate, the first bit rate being larger than the second bit rate. The first bitrate may be an integer multiple of the second bit rate. Different reader types have different capabilities, so when the reader or reader type may be estimated or determined, the bitrate capability may be ascertained. Thus, the mode selected may ensure that the bitrate with which the signal is output is suitable for the reader.

As mentioned above, if the relative movement between the reader head and the outputting element stops, a new signal may be output immediately, after a predetermined delay, or when a next head is detected.

An ninth aspect of the invention relates so an assembly of a reading device and an outputting element according to any of the fifth to eighth aspects, wherein the reading device is configured to output information and the outputting element has a receiver for receiving the information, the controller being configured to base the determination on the information received. Naturally, one of the above coils used for outputting the magnetic field may be used as a sensor.

A large number of sensors are described above. Most of those sensors are aimed at determining a characteristic of the reader. In one embodiment, the reader may be set up to provide such a characteristic or output which may be sensed by a sensor and thus transfer information to the outputting element as to which type the reader is and/or which mode would be suitable.

The reader thus may comprise a metal, magnet or paramagnetic material which may be sensed. The metal/magnet/paramagnetic material may have a position, type or other characteristic which may be distinguished from those of other readers.

Also, a roller, vibrator or the like may be provided for deforming or vibrating the outputting element to transfer information to a deformation sensor or vibration sensor of the outputting element. A sound provider may transfer information to a sound receiver of the outputting element, and an optical signal (or other electromagnetic signal; radio waves, Wifi, Bluetooth or the like) may be used in the same manner.

Finally, a number of the above sensor types and modes may be combined in any manner. Also, further elements may be provided, such as batteries and the like.

Naturally, a sensor or identifying element may be provided, such as a fingerprint reader, an iris reader, a keyboard for the entering of a PIN code, or the like may be provided as may an activating switch, such as a pressure switch, a dome switch or the like or a deformation sensor, such as a strain gauge, a piezo element, or the like may be provided, all of which provide input to the controller which may determine whether to output the magnetic signal or not—and which magnetic signal to output (differ between output of an identity signal, an account number signal, a room number signal or the like). The output of a sensor may be a simple pulse (voltage and/or current change) as would be seen by an excited coil, or may be more complex, such as representing a value, as could be seen using more complex sensor types.

Another aspect of the invention relates to a method of outputting a magnetic field from a predetermined curve in or at a surface of an outputting element to a reader head of a reader, the curve having a predetermined length the method comprising:
  a) tracking an initial direction of movement of the reader head along the curve and in relation to the outputting element,
  b) if the reader head moves along the curve for more than 80% of the length, outputting the magnetic field representing first information to the reader,
  c) if the reader head stops at a position along the curve and has travelled no more than 70% of the length along the curve, outputting the magnetic field representing second information to the reader.

This aspect may be combined with any of the above aspects, and the individual steps and elements, such as mode selections, sensings, coils, sensors, controllers etc. of the above aspects may also be used in this method.

Thus, the curve of the present outputting element may be as that described above, and the tracking may be the above-mentioned tracking using one or more sensors along the curve in order to determine the position, velocity, acceleration or the like of the reader head while travelling along the curve.

The magnetic field may be output by a single coil or a plurality of coils, as is also described above, and the positions thereof and operation may be as described above.

According to the invention, however, the information output or represented in the magnetic field output varies depending on the movement of the reader head in relation to the outputting element.

Thus, based on the movement of the reader head in relation to the outputting element, different information may automatically be determined and represented in the magnetic field output.

As described above, the information may be represented in the magnetic field by encoding it therein.

That the reader head stops may be a detection of a zero velocity of the reader head in relation to the outputting element. Alternatively, the reader head may be seen as stopped, if its velocity in relation to the outputting element falls below a lower limit, such as 5 inches per second, preferably 2½ inches per second.

Step c) may comprise outputting the magnetic field representing the second information while the reader head, after having stopped, moves in a direction opposite to the initial direction. Thus, this magnetic field may be output over only a portion of the curve, such as the 70% or less, such as 60% or less, such as 55% or less, of the length.

Actually, step a) may comprise outputting the magnetic field representing the first information.

Step b) may comprise outputting at least a first part of the magnetic field representing the first information during step a), such as when the reader head travels along the curve in the initial direction. This outputting may then be interrupted (before all of the information is output), if the reader head stops before 70% of the length. Subsequently, at withdrawal of the reader head, the magnetic field representing the second information may then be output.

Alternatively or in addition, the magnetic field representing the first information may be output during a step subsequent to step a) where the reader head travels in a direction opposite to the initial direction and for a distance exceeding 70% of the length. In the latter situation, the reader head may, during step b) travel more than 80% or 90%, such as a full length of the curve, where the magnetic field is then output during the opposite movement which may be tracked in the same manner as in step a). Then, the reader head may, between steps a) and b) be positioned outside or at an edge of the outputting element, before the movement in the opposite direction is commenced.

A final aspect of the invention relates to an outputting element comprising:
- one or more field generators configured to output a magnetic field, the generator(s) positioned along a predetermined curve in or at a surface of the outputting element,
- one or more sensors for determining a position of a reader head of a reader,
- a controller configured to receive information from the sensor(s) and output signal(s) to the field generator(s) and to:
- track an initial direction of movement of the reader head along the curve and in relation to the outputting element,
- if the reader head moves along more than 80% of the curve, outputting a signal to the field generator(s) representing first information,
- if the reader head stops at a position along the curve and within 70% of the curve, outputting to the field generator(s) a signal representing second information.

This aspect relates to the former aspect. All elements of the above aspects may be used, such as for outputting the magnetic fields, sensing the reader head, controlling the individual elements and the like. The first and second information may be stored in a storage of a controller or the like. Again, the tracking may be performed using one or more sensors provided or positioned along the curve, and the outputting element may be card-shaped as is described above.

The first information may relate to an identity or an account number, for example, of an individual, where the second information may be temporary information which may be replaced, deleted or added more liberally, such as by a trusted entity, such as an employee at a hotel. This information may be personal to the individual for a limited period of time, such as a hotel room number or other information allowing the person to gain access to a service or facility.

In the following, preferred embodiments will be described with reference to the drawing, wherein.

Figure 1:
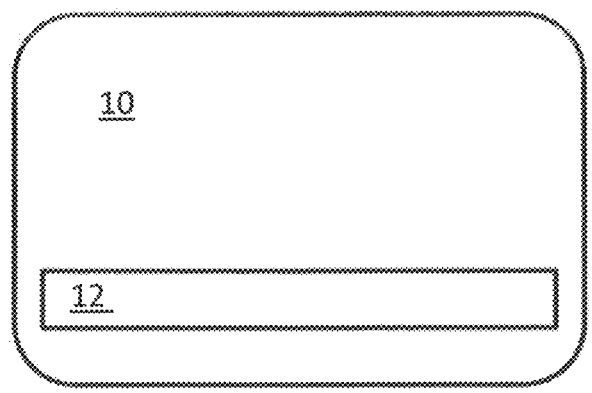
FIG. 1 illustrates a prior art credit card with a magnetic strip.

In FIG. 1, a credit card type element 10 is seen having a magnetic strip 12. In the most widely used legacy cards, this strip 12 is formed of a layer of a magnetic material magnetized along up to three tracks (along the longitudinal direction) and forming individual magnetic areas representing digital 1's and 1's.

In more recent card types, the old-fashioned magnetic strip is replaced by a magnetically conducting material and a coil generating a varying magnetic field in the conducting material.

Figure 2:
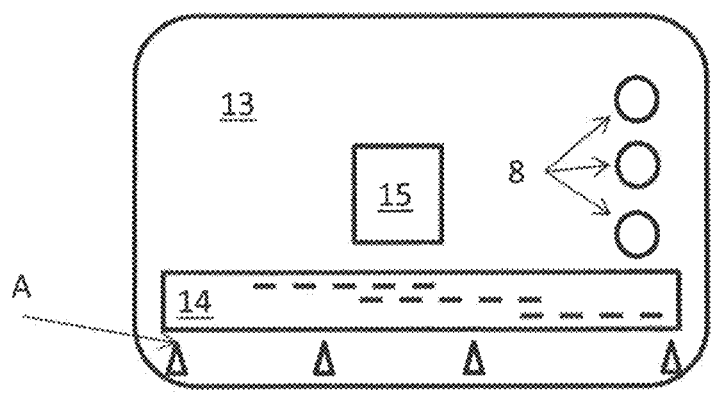
FIG. 2 illustrates a credit card with a dynamic magnetic strip and sensors.

In FIG. 2, a card 13 with this material 14 is illustrated (omitting the coil to increase clarity). Naturally, the assembly of the material 14 and the coil may be replaced by an elongate coil taking up the length of the material 14 in FIG. 2. Three tracks are indicated by hatched lines. The tracks usually are parallel and extend through the length of the material/strip 14.

The operation of this dynamic strip is to output a signal emulating that, which a reader head 16 senses when moving along the material 14. Thus, the magnetic field in the material 14 is varied to emulate the field generated by the old-fashioned magnetic strip. To this end, a controller 15 is configured to feed the coil in such a manner that the magnetic field varies as desired, when the reader head 16 (see FIG. 3) is positioned over or moves along the material 14. Naturally, the speed of the reader head 16 over the material 14 may be determined so that the full signal is provided while the reader head is over the material. Also, the controller may control the bit rate of the signal generated for other purposes.

As the material 14 should output the magnetic field only when the reader head 16 is within range of the magnetic field output, the card usually has one or more types of sensors which are intended to detect the presence of the reader head and initiate the outputting of the magnetic field. In FIG. 2, a plurality of proximity or swipe sensors A are positioned along the material 14. From the output of these sensors, the position of the reader head may be determined as may the velocity/acceleration thereof in relation to the card 13 and the direction of the swipe.

The sensors may be used for timing the outputting of the magnetic field from the material 14.

Figure 3:
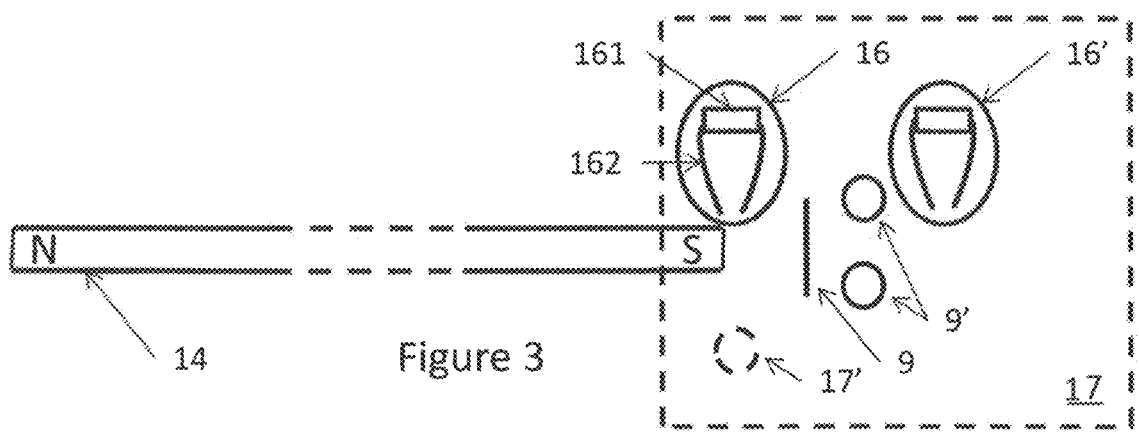
FIG. 3 illustrates a credit card entering a two head card reader.

A number of problems exist when introducing an assembly of this type in a card reader 17 (see FIG. 3). A large amount of metals and/or paramagnetic materials 17' may be present which both may affect the magnetic field output and may confuse the sensors A of the card 13, so that the magnetic field is output too soon, too late, too fast or too slow, for example.

In FIG. 3, the material or dynamic magnetic strip 14 is illustrated (the remainder of the card 13 is left out) when introduced into a card reader 17 having multiple reader heads. In many motorized card readers, a first reader head 16 is provided on the outer side of a door 9 and another head 16' is provided on the inner side of the door 9. The operation of the outer head 16 is to sense the presence of a magnetic signal and to open the door 9. Introduction of the card will then be handled by rollers 9' which guide the card past the second reader head 16' which then receives the magnetic field and operates as desired on the basis thereof (withdrawal of cash, identification of a person or the like).

Thus, in addition to the erroneous detection of metal/paramagnetic material 17' as a reader head, the card should also be able to recognize the situation where multiple reader heads are present.

In this context, it is noted that in other reader types where only a single reader head is present, such as insert readers, the card may be translated past the reader head twice, once on the way into the reader and once more on the way out. Such readers may operate to only read a magnetic field when the card is on its way out of the reader. Thus, this type of situation should also preferably be recognized and distinguished from the two head motorized readers.

In a standard manual swipe reader, the user will swipe the card through the reader in a single swipe in a single direction.

In addition to the possible interference of metals and/or paramagnetic materials and the different modes of operation, also other problems may be seen when wishing to transfer a magnetic signal to a reader.

It has been found (see EP14199442.6 and Applicants co-pending application filed on even date and titled "A method and an assembly for generating a magnetic field and a method of manufacturing an assembly"—PCT/EP2015/080663) that also different types of reader heads will require different operation manners of the material 14.

Figure 4:
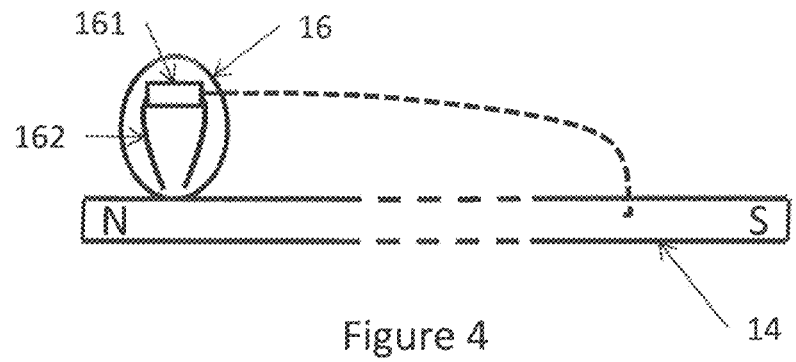
FIG. 4 illustrates a first type of reader head.

In FIG. 4 is illustrated the essential contents of a reader head 16 of the type usually used for reading magnetic strips. This head 16 comprises a sensing coil 161 and a yoke 162 for guiding magnetic fields from the material 14 to the coil 161 in the same manner as with the old-fashioned magnetic strips.

In FIG. 4, the reader head 16 is illustrated at an end portion of the material 14. In this situation, it has been found that the expected reading sensitivity is far from obtained. A reason for this is that the coupling between the magnetic field generated in the material and the coil 161 is not as intended, when the operation of the material 14 is to emulate a single, oblong magnet. When the reader head 16 is close to one end of the "magnet", as illustrated, a majority of the field lines will enter the reader head 16 and run within the left leg of the yoke 162 but will not return via the right leg of the yoke 162. Instead, the field lines will exit the reader head 16 and travel in the air to the other pole of the magnet. Clearly, small angular deviations in the reader head coil 161 thus will have an impact on the field sensed.

Thus, what is experienced is that at positions close to the ends of the material 14—or rather far from the centre of the material 14, a difference in performance is seen. Usually, one end will have an over compensation and the other an under compensation, and different amplitudes may be seen.

Figure 5:
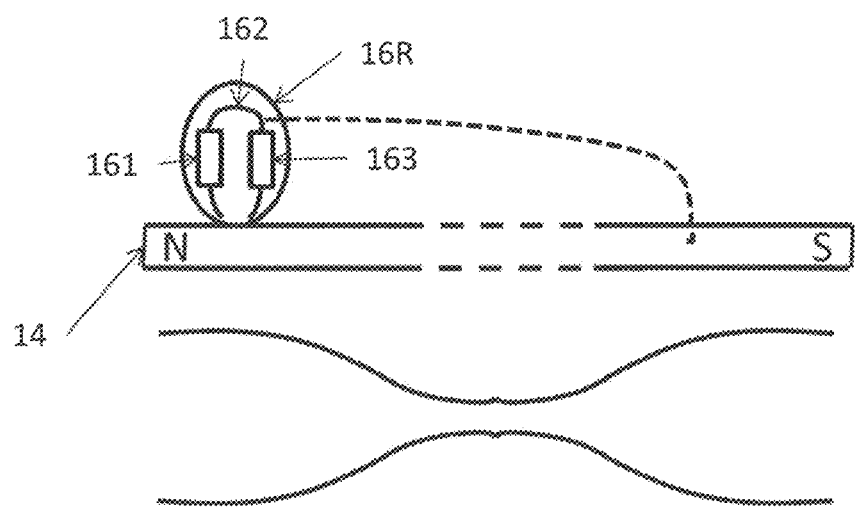
FIG. 5 illustrates a second type of reader head.

In FIG. 5, compared to FIG. 4, another type of reader head 16R is seen. This head 16R also has the yoke 162 and the reading coil 161, but present is also a writing coil 163 which may be used for writing information to the strip 14. The writing coil 163 is not relevant in this connection, but it is seen that the angle of the reading coil 161 has a symmetry axis more or less perpendicular to the strip 14, where in FIG. 4 it was more or less parallel thereto.

Naturally, this affects the sensitivity of the reader head 16R to the magnetic field generated. This sensitivity is illustrated for a single coil extending along the full length of the strip 14. It is seen that the sensitivity, as expected, is rather low at the centre of the coil 14 and larger at the ends thereof. As explained in relation to FIG. 4, the yoke 162 it not used as initially intended by the magnetic field which, at the centre of the strip 14, is perpendicular to the axis of the coil and therefore has a low transfer of the field to the coil 161.

This means that the optimal area of operating a coil forming a strip 14 or a part thereof is to operate it when the reader head 16R is at the end portions thereof.

In addition, it is seen that when wishing to operate only coils from the reader head position and to one side thereof, not the full length of the coils can be utilized. This may be counteracted by selecting, at a point in time where a number of coils behind the reader head position are available, coils behind the reader head position and thus shifting from operating the coils so that the reader head is trailing the operated coils to the reader head heading the operated coils—that is moving the reader head from the trailing high sensitivity part to the reader heading sensitivity part.

In order to not confuse the detection circuit receiving the signals from the reader head, the polarity or phase of the magnetic field output of the operated coils and thus of the signal transmitted to the coils may be reversed at the same time.

Suitably, this shift in operated coils may take place when a "normal" sequential shift takes place, where the phase of the signal fed to the coils is also reversed.

In that manner, the reader head shifts from receiving the field at the trailing, operated coils to that at the reader heading, operated coils, and the reader head is now able to receive the magnetic field over substantially all of the length occupied by the coils.

This may be particularly relevant where the period of time available for outputting the magnetic field to the reader head, if the above shifting is not performed, is too low for the magnetic field to be transferred to the reader head with e.g. a bit rate suitable for the reader head. If a too high swiping speed is detected, this shift may increase the period of time available so that the magnetic field may be output with the desired parameters. Thus, it is desired to distinguish between a number of parameters, as different readers, reader types, reader head types, for example, pose different problems or challenges.

Naturally, a simple manner of distinguishing between different types of readers is to have a user or operator indicate to the card, such as via push buttons or touch sensitive areas 8 illustrated in FIG. 2, which type of card reader is used or which parameters it requires. Alternatively, a deformation or vibration sensor such as a piezo electric element may be provided in the card so that a tapping on the card in a particular rhythm or a predetermined number of times will indicate to the card the type of reader.

In another embodiment, the reader may indicate its type or requirements to the card, such as using the first reader head 16 (FIG. 3) or the read/write head 16R which then may also be used for outputting magnetic fields (see further below). The card usually will have one or more sensors (e.g. swipe sensor A) which may be used for picking up a magnetic signal and forward information to a controller which may then act accordingly.

Alternatively, it could be desirable to distinguish or identify readers on the basis of their operation and/or construction.

A large number of sensor types may be used for detecting sensor type or other parameters of the sensor, such as the number of heads, the distance between the reader heads, a swipe velocity in relation to the reader head as well as any variations therein, the swipe type, the reader head type or the like.

Suitable sensor types may be inductive or capacitive sensors which are useful for detecting the presence of a reader head. These sensor types will also sense the presence of metals, magnets and paramagnetic materials. Different constructions and embodiments of readers will provide different feedback or influence on sensors of these types.

Other types of sensors may be vibration sensors, deformation sensors and/or sound sensors. The vibration/deformation/sound sensors may be used for sensing parameters of the reader, such as during introduction and/or withdrawal thereof into/from the reader. Rollers, motors, guides and the like will make different sounds/vibrations/deformations of the card. These may be used for distinguishing readers.

A radiation sensor may receive radiation scattered by or emitted by the reader, whereby the internal reader construction will be distinguishable. The card may comprise a radiation emitter to ensure that sufficient radiation is available for a sensible determination.

A single sensor may give some information. Providing multiple sensors detecting the same parameter, such as the presence of the reader head (swipe sensors A) along the direction of the material 14 will not only determine the parameter but also the parameter during the swipe of the reader head. From the reader head detections, not only the reader head position may be determined, also its velocity and acceleration may be detected. These parameters may also aid in the distinguishing between e.g. motorized readers.

Other sensor types are described above.

The combined output from the sensors of the card may be used for generating a "fingerprint" characterizing the reader or reader class/group. The fingerprints may be stored in the controller together with parameters defining the mode suitable for the type of reader. Success of a mode may be seen, e.g., when no swipe is performed for a predetermined period of time indicating that the just performed swipe was successful. Naturally, fingerprints and mode parameters may be fed to the card during e.g. an initialization or the like, and/or they may be generated over time from trial/error of the card during use determining which mode is the best for a particular type of fingerprint. Fingerprints may be uploaded to a central server or fed to the reader for outputting to other cards.

As mentioned, a large number of reader types exist, each of which has a particular manner of operation and thus should be treated differently.

In a swipe reader, the user will swipe the card past a single head a single time.

In an insert reader, the user will introduce the card into the reader and instantly pull the card out of the reader again. Thus, the same head is experienced twice—once in each direction.

In a motorized reader, the user will introduce the first edge of the card into a slot which is blocked by the door 9. The first reader head 16 will sense the magnetic field of the card (which therefore should be operating already at that point in time) and open the door. Rollers 9' will grab the card and translate it into the reader 17 and past the other head 16', where the card should again be operating—but now perhaps in another mode.

Figure 6:
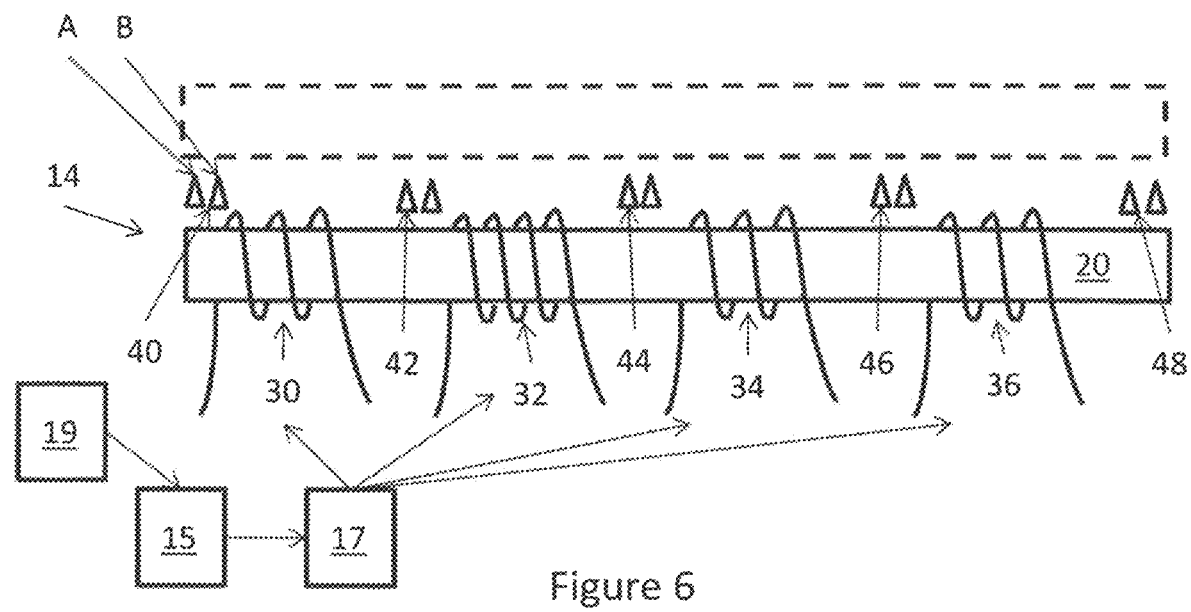
FIG. 6 illustrates a card with a dynamic magnetic strip formed of multiple coils.

In FIG. 6, an embodiment of essential parts of a card 13, including a magnetic strip 14 embodying a single track, is illustrated where a magnetic core material 20 receives magnetic fields generated by four coils 30, 32, 34 and 36 along its longitudinal direction. The coils may be identical in shape, dimensions, parameters (diameter, core or not, number of windings, pitch, wire thickness, wire material or the like) or not. The coils 30, 32, 34 and 36 may be operated simultaneously and in the same manner to emulate a single, long coil, or may be operated sequentially, as will be described below.

Consequently, different parts along the length of the strip may be operated and others not.

The controller 15 may feed the coils individually either directly or via e.g. a switch 17 which is provided with the signal to be provided and information identifying the coil(s) to receive the signal.

A sensor 19 may be provided for waking up the controller 15 or for identifying a user to inform the controller whether it is OK to output the signal to the coils. This waking up element may be a deformation sensor (piezo sensor, deformation sensor, strain gauge, dome switch or the like). Also, an identification of a user may be performed in order to ensure that the information/signal(s) is only output when the user wishes it. This identification may be based on a fingerprint sensor, an iris sensor, a keyboard or the like.

Additional sensors may be provided on or in the card, as described above.

Clearly, the sensors A or pairs of sensors A and B can be used for determining or estimating the position, velocity, acceleration and direction of the swiping head.

Thus, a distinguishing between the detection of two heads of a motorized two-head reader and an insert reader may be obtained. Also, a distinguishing between different two-head readers may be obtained by e.g. the distance between the two heads.

With the segmentation of the coil into segments, the segment(s) desired may be operated at any time—such as coordinated with a determined or assumed position of the reader head.

Then, the different operation manners indicated in FIGS. 4 and 5 may be obtained so that different types of reader heads may be catered for.

This may be obtained by operating the coils 30, 32, 34 and 36 so that only e.g. two coils are operated at the time. When the reader head is detected to the left, the coils 30 and 32 are operated. When the reader head is detected over the coil 32, the coil 30 is no longer operated, but the coil 34 is brought into operation. When the reader head is detected over the coil 34, the coil 32 is brought out of operation and the coil 36 operated.

Figure 7:
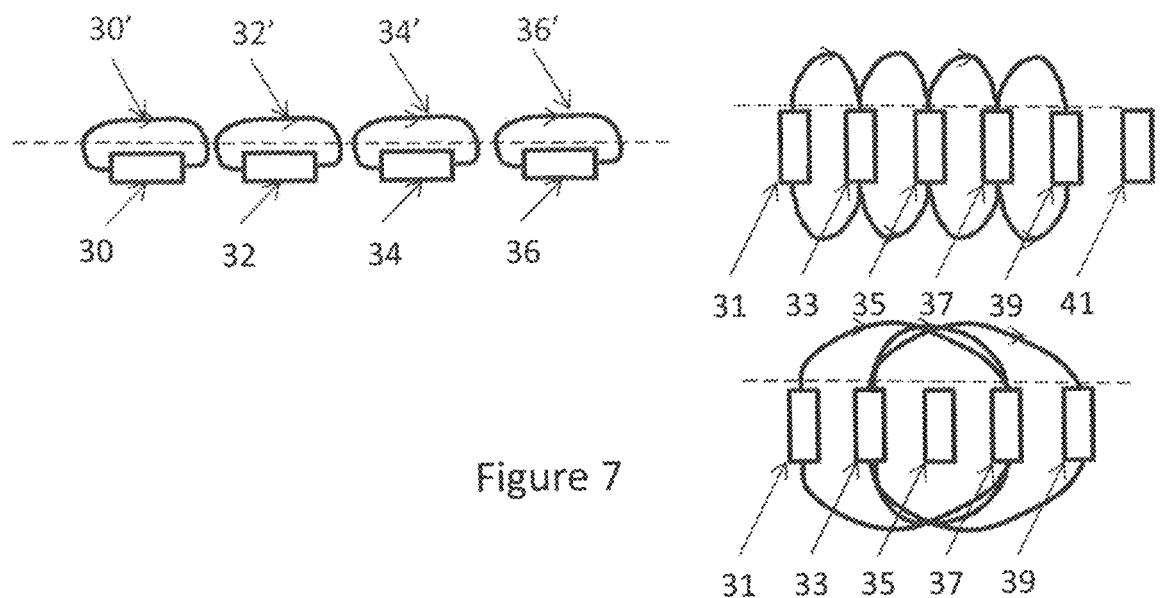
FIGS. 7 and 9 illustrate different types of coils and different manners of providing magnetic fields.

In FIG. 7, it is illustrated how to obtain similar fields with different orientations of coils. To the left, a setup as seen in FIG. 6 is seen where the coils 30, 32, 34, 36 and their resulting magnetic fields 30', 32', 34' and 36' are illustrated.

The coils 30, 32, 34, 36 may be helical coils formed around the same or different cores, if a core is desired. When the reader head 16 moves along the row of coils, the magnetic fields may be varied to represent the information desired.

To the right, another set-up is seen where coils 31, 33, 35, 37, 39 are provided in a rotated manner (exterior surface illustrated by hatched lines). It is, however, seen that when driving neighbouring coils oppositely, a similar magnetic field may be obtained.

A difference is seen when multiple neighbouring coils in the left illustration are driven simultaneously and in the same manner, were the resulting magnetic fields will add up.

In the upper right illustration, the same type of magnetic field may be obtained, but the coils 31, 33, 35, 37 and 39 may be operated in a different manner. It may be desired to operate two coils which are not neighbouring (such as coils 33 and 37) oppositely. In this manner, an overall magnetic field is obtained which may be moved with the movement of the reader head 16 by rendering one coil inoperable and another further along the direction of movement operable. Preferably, the "new" coil is operated, before the "other" coil is made inoperable, and preferably, the coil to be made inoperable is stopped, before the reader head 16 reaches the back side of that coil.

In the lower right illustration, it is seen that the coils 31 and 33 are operated and provide flux lines upwardly, while the coils 37 and 39 are operated reversed. The coil 35 is not operated. A magnetic filed is generated as illustrated, and when shifting coils, the coils 31 and 37 may be rendered inoperable, while a coil 41 neighbouring to coil 39 is operated in the same manner as coil 39, while the coil 35 is now operated in the same manner as coil 33. A shift is then obtained while maintaining the magnetic field output and direction.

Figure 8:
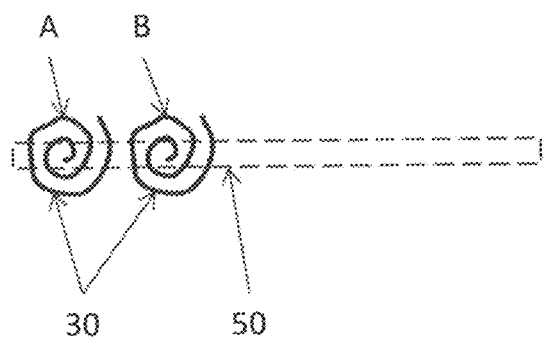
FIG. 8 illustrates flat coils.

The coils of FIG. 7 may be helical coils with or without cores. However, the coils of especially the right illustrations may be much simpler planar coils such as those illustrated in FIG. 8.

Thus, the operated coils may be selected on the basis of the mode or reader head type determined. If the reader head is of the type seen in FIG. 4, the coils may be selected so that the reader head is around the middle of the row/group of coils. If, on the other hand, the reader head is of the type seen in FIG. 5, the coils may be selected so that an outermost coil (in the direction of swipe or in the opposite direction) is below the reader head and the other coils only to one side of that coil, so that the reader head is positioned at one end of the row/group of coils instead of at the centre thereof.

Thus, in the embodiment illustrated in FIG. 6, left side, the coils 30/32 and optionally also 34 may be operated when a reader head is over the coil 30, and the coil shift to the right may be performed when the reader head no longer is over the coil 30. Alternatively, the coils 30 and 32 may be operated, when the reader head is over the coil 32, and the right shift in coils may be performed when the reader head no longer is over coil 32. In this manner, a reader head 16R as seen in FIG. 5 is catered for.

Figure 9:
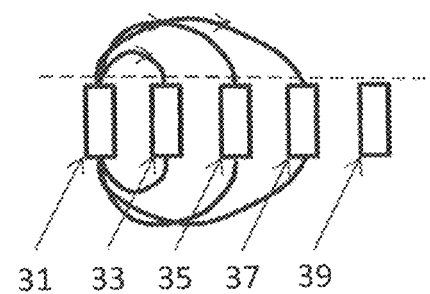

In the coil set-up to the right in FIG. 7, the coils 31, 33, 35, 37 and 39 may be operated as illustrated in FIG. 9, where, when the reader head 16 is close to the coil 31, the coil 31 is operated, as is coil 33 and optionally also coils 35 and 37, for example. When the reader head approaches the coil 33, coil 31 is no longer operated, and the coils 33, 35 and optionally also 37 and 39 are operated.

Due to the fact that at coil shift, the operation of the coil (33 in this example) may be a reversal of the current in the coil, it may be desired to, when the reader head is above the coil 31, not operate coil 33 and only operate this (now in the same manner as the coil 31 was operated), when the reader head approaches coil 33, where the coil 31 is brought out of operation and the coil 35 then could be brought out of operation in order to, in the same manner, facilitate the later bringing into operation thereof.

Clearly, by selecting the number of coils operated at one time as well as the position of the reader head in relation to the operated coils, the angle between the magnetic field and the reader head, such as a read coil in the reader head, may be selected.

In addition to the different types of segmentation of the coil or the use of the full coil for the outputting of the magnetic field, a number of other manners also exist of adapting the magnetic field output to a particular type of reader.

In one situation, it may be desired to adapt the intensity/field strength/amplitude of the magnetic field output as a function of the position of the reader head along the material 14.

This may be to counteract a sensitivity difference of the reader head along the material. A number of reasons for a sensitivity difference exist. One reason is that illustrated in FIG. 5. A difference in sensitivity may also be caused by e.g. the presence of metals, magnets or paramagnetic/dielectric materials in the reader, variations in the distance between the reader head and the card or the coil(s) therein, variation in the angle between an axis of a coil of the reader head and the magnetic field lines. Also, the fact that away from the ends of the extreme, operated coils, the field lines are more spaced will make the available field strength slightly lower at such positions.

In another situation, it may be desired to output the magnetic field a predetermined minimum period of time subsequent to a first detection of the reader and/or the reader head. This is an advantage when the magnetic field is used for e.g. opening a shutter in a motorized reader.

In some situations, a first reader head detection may be a false reading. A piece of metal or the like may, for example, interfere with the sensors and trigger an outputting of the magnetic field. Also, a real reader head may be sensed by a sensor but the card swipe may then stop for whatever reason. Stopping the swipe may mean that a reader will expect the magnetic field at a later point in time.

Using a plurality of sensors along the length of the material 14 (see FIG. 6), makes it possible to estimate the velocity of the detected head and therefore when the reader head should be sensed by the next sensor(s) along the material 14.

Thus, if a next detection is not received within a period of time (a minimum velocity of e.g. 2½ inches per second may be used) around this estimated detection time, the first detection may be erroneous and the controller may stop generating the magnetic field. Alternatively, the controller may assume that the sensor head is still moving but not sensed and thus output the remainder of the information with a bit rate assuming a predetermined velocity.

Thereafter, the controller may pause for a predetermined period of time (such as 50-250 ms) and then resume by outputting the magnetic signal anew. Alternatively, the controller may simply stop outputting the magnetic signal and only start over after a new reader head detection or after a detection of movement of the reader head.

In addition, if two heads/swipes are detected briefly after each other, such as within 30 seconds, it may be desired to output the magnetic field using the same mode both times. Alternatively, different modes may be selected for the two heads.

If no swipe has been detected in a predetermined period of time, a standard or pre-set mode may be used for the next swipe.

A number of modes may therefore be determined.

In a first mode, suitable for standard swipe readers where only a single head is experienced a single time in a single swipe direction. In this mode, the magnetic signal may be output by all of the material 14 or a part thereof. The outputting of the signal may be controlled by the swipe velocity to ensure that the magnetic signal is output as desired. Often, the magnetic signal represents information, and it is desired that all information is output before the reader head is out of reach. If the coil is segmented (as in FIG. 6), the coils may be operated so that the reader head position is at the centre of the operated coils, as the reader head type of FIG. 4 is typically used.

A second outputting mode may be desired for swipe sensors using the reader head type of FIG. 5, where the operated coils are selected with an extreme coil positioned below or close to the reader head and the others only to one side thereof.

Distinguishing between when to use the above two modes may be based on outputs from other sensor types (vibration/deformation or the like) of the card. Alternatively, if the card is swiped repeatedly in a single swipe manner in the first mode, indicating that the reading of the magnetic field output is not read satisfactorily, the controller may shift to the second mode.

In insert readers, the same head 16 or 16R is seen twice—but the swipes will be detected in opposite directions. It may be possible to distinguish between two successive single swipes in a swipe reader and a swipe in an insert reader by comparing the swipe directions. Often, two single swipes are not performed within e.g. 1-2 seconds, as the second swipe is normally only performed, when the reader has informed the user that the first swipe did not succeed. In an insert reader, the card may be stopped at the bottom of the reader, where the reader head is positioned at, such as rests against, the card edge, where it may be sensed by a card sensor. Thus, the reader head has been detected but is now stopped. The outputting of the information may start, when the reader head is again in motion.

In a third mode, the same manner of outputting the magnetic field is used in both swipes (both directions).

In another mode, the magnetic field may be output differently in the two directions. The first outputting of the magnetic field may be a pre-set mode such as one for use in swipe readers.

When the second swipe is sensed, the card may realize that an insert reader is experienced, where another mode may then be selected which is suitable for insert readers.

It may be desired to output the magnetic field only during the second passage (out of the reader), but as some readers may receive the field in the introduction direction, the default mode may be to output the magnetic signal in both directions. Again, if other sensor types are used, it may be possible to distinguish between such readers, and/or readers with the reader heads 16 and 16R, and thus provide specific operation modes for different reader types.

In motorized readers, multiple heads are used. Usually, at least the second reader head 16' is of the type seen in FIG. 5. Thus, not only are multiple heads seen, but the reader heads may be of different types and thus require the outputting of the magnetic field in different manners. It is noted that the first reader head 16 may merely need to register a magnetic field, so the card may be run in a default mode. A motorized reader may be detected when two or multiple heads are detected travelling in the same direction. It is noted that, subsequently to this, the same number of heads may be detected moving in the opposite direction.

A mode thus may be initially outputting the magnetic field in one mode, such as a default mode, and then, when detecting another head in the same direction, outputting the field in another mode, such as that useful for the reader head 16R. In this mode, no field may be output when (the) heads are detected in the opposite direction. In another mode, a field may be output also to heads moving in the other direction. The actual mode of outputting this or these fields may be selected, such as from further information, such as data relating to a distance between the detected heads, speed/direction of movement of the reader head(s), the presence of metals etc. or reflection of the reader, as described above.

It may be decided to, when detecting a next head within a predetermined period of time after having detected an earlier head or outputting a field to a reader head, output a field to the next head using the mode in accordance to which the field was output to the previous head. This predetermined period of time may be 1 s, 2 s or more, or could be even 2 min, so that this mode is used until a transaction has taken place, for example.

When the outputting element is able to detect, sense or determine other parameters of e.g the reader, such as the amount of metal/magnetic material/paramagnetic material, the velocity of swipe, other swipe parameters, such as the distance between heads, the position or other parameters (distances, resonance frequencies or the like) rollers or other elements affecting, such as transporting, moving, guiding the outputting element or the like, such parameters may also be used in the mode determination. Clearly, when the outputting means is swiped, its interaction (touch, guiding, sliding, impact) therein may be sensed, such as by a deformation sensor, a vibration sensor, an accelerometer or the like.

In a particular embodiment, the mode is selected so that an angle of the magnetic field output is within a desired interval in relation to a reader head, such as a coil in the reader head.

In that or another embodiment, the mode is selected to have a predetermined field strength along the swipe. This strength may be increasing along the swipe, decreasing along the swipe, decreasing from a centre (or other predetermined part thereof) of the outputting element toward edges thereof or increasing from the edges toward a centre or other predetermined part thereof.

When multiple tracks are provided, modes may be chosen using different numbers of tracks and/outputting different data from the individual tracks. Usually, predetermined first information is output from track 1 and predetermined second information is output from track 2. Thus, in one mode, only track 1 is operated, only outputting the first information, and in another mode, tracks 1 and 2 are operated now outputting a combination for the first and second information. In another situation, it may be desired to have a mode where the first information is, in fact, output from track 2 instead of track 1.

Naturally, any combination of the above modes, features and detection methods may be used. Also other types of readers may exist having different parameters or different types of reader heads or the like. Thus, a particular mode may be generated for each reader, or different modes may be tested to identify a suitable mode.

In another embodiment, the card may be used both as a credit card/debit card/identity card/loyalty card or the like where information is to be output over most of the length of the curve or strip. In another situation, the same card may be used for opening hotel doors where only a portion of the curve or strip is introduced into the dip reader or insert reader of the hotel door but where it is desired that the card itself identifies the hotel door mode and thus operates in the correct manner when inserted only partly into an insert reader.

This may be obtained by using any of the above card types which is able to detect that a reader head stops at a position over the card and along the curve and to determine that subsequently, the reader head is moved in the opposite direction. In that situation, the card has been introduced only partly into an insert reader, and the information then output may be of a particular type which is different from information output when the head moves along the full length of the curve, which information may be credit card information, identity information or the like.

Thus, the owner of the card may now, in a hotel or at other facilities with the same type of readers, produce the card to a manager of the hotel or facility and have the card coded to a mode where particular information is output when the reader head moves in one direction, stops along the curve and then moves in the opposite direction.

The skilled person will know how to test this and arrive at a mode suitable for any reader in any situation.

Embodiments

1. A method of outputting a magnetic field from an outputting element to a reading device, the method comprising:
   determining one of a plurality of outputting modes,
   outputting, from the outputting element, the magnetic field in accordance with the determined outputting mode.

2. A method according to embodiment 1, wherein the determining step comprises outputting a first magnetic field to the reading device in a predetermined mode of the plurality of modes, sensing one or more parameters and basing the determination on the parameter(s) sensed, the outputting step comprising outputting, subsequent to the determining step, the magnetic field in another mode of the plurality of modes.

3. A method according to any of the preceding embodiments, wherein the determining step comprises sensing a number of reader heads of the reading device and determining the mode on the basis of the number of heads sensed.

4. A method according to embodiment 3, wherein the determining step comprises estimating a distance between two or more sensed reader heads and determining the mode on the basis of the distance estimated.

5. A method according to embodiment 3 or 4, wherein the determining step comprises determining, for one or more sensed reader heads, a direction of travel of the reader head(s), in relation to the outputting element, and determining the mode on the basis of the direction(s) determined.

6. A method according to any of embodiments 3-5, wherein the determining step comprises sensing the reader head(s) at different positions of a surface of the outputting element and determining the mode on the basis of a comparison between a period of time elapsed between two successive sensings of a reader head and a predetermined maximum period of time.

7. A method according to any of the preceding embodiments, wherein the determining step comprises determining a number of parameters of the reading device, comparing the parameters with parameters stored in the outputting element and determining the mode on the basis of the comparison.

8. A method according to any of the preceding embodiments, wherein the determining step comprises initially determining or sensing a deformation of the outputting element and determining the mode on the basis of the deformation.

9. A method according to any of the preceding embodiments, wherein the determining step comprises receiving radiation from the reading device and determining the mode on the basis of the radiation received.

10. A method according to any of the preceding embodiments, wherein the determining step comprises sensing vibrations from surroundings of the outputting element and determining the mode on the basis of the vibrations sensed.

11. A method according to any of the preceding embodiments, wherein the determining step comprises sensing a presence of a metal and/or a paramagnetic material and determining the mode on the basis of whether the metal/paramagnetic material is present or not.

12. A method according to any of the preceding embodiments, wherein the determining step comprises determining an acceleration or a velocity and/or a variation thereof, of the outputting element in relation to the reading device, and determining the mode on the basis of the acceleration, velocity and/or variation determined.

13. A method according to any of the preceding embodiments, wherein the determining step comprises the outputting element receiving an input from a user, where the determination of the mode is based on the input received.

14. A method according to any of the preceding embodiments, wherein the determining step comprises the reading device outputting information and the outputting element receiving the information and basing the determination on the information received.

15. A method according to any of the preceding embodiments, wherein the outputting element has a plurality of coils positioned sequentially along a predetermined curve in the outputting element or on a surface thereof.

16 A method according to embodiment 15, wherein one outputting mode is a mode wherein only a part of the coils are operated simultaneously.

17. A method according to embodiment 16, wherein one outputting mode is a mode where a position of a reader head of the reading device, in relation to the outputting element, is determined and a group of coil is selected, the group comprising the operated coils, so that the determined position has a predetermined relationship with a predetermined coil of the group of coils.

18. A method according to embodiment 17, wherein the outputting step comprises selecting the group of coils as a sequence of neighbouring coils.

19. A method according to embodiment 18, where the coils of the group define a length and are selected so that the determined position of the reader head is within 25% of the length from a centre of the group of coils.

20. A method according to embodiment 18, where the coils of the group define a length and are selected so that the determined position of the reader head is no less than 30% of the length from a centre of the group of coils.

21. A method according to embodiment 15, wherein one outputting mode is a mode wherein all the coils are operated simultaneously.

22. A method according to any of the preceding embodiments, wherein one outputting mode is a mode where a position of a reader head of the reading device is determined, in relation to the outputting element, and an amplitude of the magnetic field is determined from the position determined.

23. A method according to any of the preceding embodiments, wherein a first and a second outputting mode are modes wherein the magnetic field represents a digital signal, where the first mode is a mode wherein a bit rate of the magnetic field is a first bit rate and the second mode is a mode wherein a the bit rate of the magnetic field is a second bit rate, the first bit rate being larger than the second bit rate.

24. A method of outputting a magnetic field from a predetermined curve in or at a surface of an outputting element to a reader having a reader head, the method comprising:
a) tracking an initial direction of movement of the reader head along the curve and in relation to the outputting element,
b) if the reader head moves along more than 80% of the curve, outputting the magnetic field representing first information to the reader,
c) if the reader head stops at a position along the curve and within 70% of the curve, outputting the magnetic field representing second information to the reader.

25. An outputting element comprising:
one or more field generators configured to output a magnetic field,
a controller configured to determine one of a plurality of outputting modes and control the one or more field generators to output a magnetic field in accordance with the determined outputting mode.

26. An outputting element according to embodiment 25, further comprising one or more sensors.

27. An outputting element according to embodiment 26, wherein the controller is configured to:
control the one or more field generators to output a first magnetic field in a predetermined mode of the plurality of modes,
receive, from the sensors, one or more parameters,
base the determination on the parameter(s) sensed, and
control the one or more field generators to output the magnetic field in another mode of the plurality of modes.

28. An outputting element according to embodiment 26, wherein the sensor(s) is/are configured to sense one or more reader heads of a reading device.

29. An outputting element according to embodiment 28, wherein the controller is configured to determine a number of sensed reader heads and determine the mode on the basis of the number of heads determined.

30. An outputting element according to embodiment 28, wherein the controller is configured to estimate a distance between two or more sensed reader heads and to determine the mode on the basis of the distance estimated.

31. An outputting element according to any of embodiments 28-30, wherein a sensor is configured to sense a direction of travel of a reader head and wherein the controller is configured to receive a signal from the sensor and determine the mode on the basis of the signal received.

32. An outputting element according to any of embodiments 28-30, wherein the sensors are positioned at different positions in relation to a surface of the outputting element and wherein the controller is configured to determine the mode on the basis of a comparison between a period of time elapsed between two successive sensings, by two different sensors, of a reader head and a predetermined maximum period of time.

33. An outputting element according to any of embodiments 25-32, further comprising a storage and wherein the controller is configured to determine a number of parameters of the reading device, compare the parameters with parameters stored in the storage and determine the mode on the basis of the comparison.

34. An outputting element according to any of embodiments 25-33, further comprising a deformation sensor, wherein the controller is configured to receive a signal from the deformation sensor and determine the mode on the basis of the signal from the deformation sensor.

35. An outputting element according to any of embodiments 25-34, further comprising a radiation sensor, the controller being configured to receive a signal from the radiation sensor and determine the mode on the basis of the signal from the radiation sensor.

36. An outputting element according to any of embodiments 25-35, further comprising a vibration sensor, the controller being configured to receive a signal from the vibration sensor and determine the mode on the basis of the signal from the vibration sensor.

37. An outputting element according to any of embodiments 25-36, further comprising a sensor configured to sense the presence of a metal, magnet or paramagnetic material, the controller being configured to receive a signal from the sensor and determine the mode on the basis of the signal received from the sensor.

38. An outputting element according to any of embodiments 25-37, further comprising a sensor for determining a velocity and/or a variation thereof, of the outputting element in relation to the reading device, the controller being configured to receive a signal from the sensor and determine the mode on the basis of the signal received.

39. An outputting element according to any of embodiments 25-38, further comprising an input element configured to be operated by a user, the controller being configured to receive a signal from the input element and determine the mode based on the signal received.

40. An outputting element according to any of embodiments 25-39, wherein the outputting element has a plurality of coils positioned sequentially along a predetermined curve in the outputting element or on a surface thereof.

41. An outputting element according to embodiment 40, wherein the controller is configured to determine an outputting mode wherein only a part of the coils are operated simultaneously.

42. An outputting element according to embodiment 41, further comprising a sensor for sensing a position of a reader head of the reading device in relation to the outputting element.

43. An outputting element according to embodiment 42, wherein the controller is configured to operate the coil(s) in a mode wherein a predetermined coil of a group of coils, the group comprising all operated coils, has a predetermined relationship to the position sensed.

44. An outputting element according to embodiment 42, wherein the controller is configured to determine a mode wherein a group of neighbouring coils are operated, the group of coils defining an overall length.

45. An outputting element according to embodiment 44 where controller is configured to operate the coils in a mode wherein the determined position of the reader head is within 25% of the length from a centre of the group of coils.

46. An outputting element according to embodiment 44, where the controller is configured to determine a mode wherein the determined position of the reader head is no less than 30% of the length from a centre of the group of coils.

47. An outputting element according to embodiment 40, wherein the controller is configured to determine a mode wherein all the coils are operated simultaneously.

48. An outputting element according to any of embodiments 25-47, further comprising a sensor for sensing a position of a reader head of the reading device in relation to the outputting element, wherein the controller is configured to determine a mode wherein an amplitude of the magnetic field is determined from the position determined.

49. An outputting element according to any of embodiments 25-48, wherein the controller is configured to determine one of a first and a second mode in each of which the magnetic field represents a digital signal, where the first mode is a mode wherein a bit rate of the magnetic field is a first bit rate and the second mode is a mode wherein a the bit rate of the magnetic field is a second bit rate, the first bit rate being larger than the second bit rate.

51. An outputting element comprising:
one or more field generators configured to output a magnetic field, the generator(s) positioned along a predetermined curve in or at a surface of the outputting element,
one or more sensors for determining a position of a reader head of a reader,
a controller configured to receive information from the sensor(s) and output signal(s) to the field generator(s) and to:
track an initial direction of movement of the reader head along the curve and in relation to the outputting element,
if the reader head moves along more than 80% of the curve, outputting a signal to the field generator(s) representing first information,
if the reader head stops at a position along the curve and within 70% of the curve, outputting to the field generator(s) a signal representing second information.

52. An assembly of a reading device and an outputting element according to any of embodiments 25-51, wherein the reading device is configured to output information and the outputting element has a receiver for receiving the information, the controller being configured to base the determination on the information received.

The invention claimed is:
1. A method of outputting a magnetic field from an outputting element to a reading device, the method comprising:
causing the outputting element to move in relation to the reading device while outputting a first magnetic field to the reading device in accordance with a first outputting mode of a plurality of outputting modes and further causing the outputting element to concurrently sense one or more parameters of the reading device;
determining, at the outputting element and based on the one or more parameters sensed, a second outputting mode of the plurality of outputting modes; and
causing the outputting element to, subsequent to the determining, output a second magnetic field to the reading device in accordance with the second outputting mode, the first and second magnetic fields representing the same information.

2. A method according to claim 1, wherein
the outputting the first magnetic field in accordance with the first outputting mode includes outputting the first magnetic field from a first set of tracks of the outputting element, and
the outputting the second magnetic field to the reading device in accordance with the second outputting mode includes outputting the second magnetic field from a second set of tracks of the outputting element, the first and second sets of tracks being different sets of tracks.

3. A method according to claim 1, wherein the determining includes sensing a number of reader heads of the reading device and determining the second outputting mode based on the number of reader heads sensed.

4. A method according to claim 3, wherein the determining includes
estimating a distance between two or more sensed reader heads of the reading device and
determining the second outputting mode based on the estimated distance.

5. A method according to claim 3, wherein the determining includes
determining, for one or more sensed reader heads of the reading device, a direction of travel of the one or more sensed reader heads, in relation to the outputting element, and
determining the second outputting mode based on the determined direction of travel of the one or more sensed reader heads.

6. A method according to claim 3, wherein the determining includes
sensing a reader head of the reading device at different positions of a surface of the outputting element, and
determining the second outputting mode based on a comparison between a period of time elapsed between two successive sensings of the reader head and a particular maximum period of time.

7. A method according to claim 1, wherein the determining includes
determining one or more parameters of the reading device,
comparing the determined one or more parameters with one or more parameters stored in the outputting element, and
determining the second outputting mode based on the comparing.

8. A method according to claim 1, wherein the determining includes
sensing a presence of a metal and/or a paramagnetic material, and
determining the second outputting mode based on the sensed metal and/or paramagnetic material.

9. An outputting element, comprising:
one or more field generators configured to output one or more magnetic fields to a reading device;
one or more sensors; and
a controller configured to
control the one or more field generators to output a first magnetic field to the reading device in accordance with a first outputting mode of a plurality of outputting modes concurrently with receiving, from the one or more sensors, one or more parameters of the reading device that are sensed by the one or more sensors,
determine, based on the received one or more parameters, a second outputting mode of the plurality of outputting modes, and control the one or more field generators, subsequently to the determining, to output a second magnetic field to the reading device in accordance with the second outputting mode, the first and second magnetic fields representing the same information.

10. An outputting element according to claim 9, wherein the one or more field generators are configured to output the one or more magnetic fields in one or more tracks of a plurality of tracks, and the controller is configured to control the one or more field generators to output the first magnetic field from a first set of tracks of the plurality of tracks, and output the second magnetic field from a second set of tracks of the plurality of tracks, the first and second sets of tracks being different sets of tracks of the plurality of tracks.

11. An outputting element according to claim 9, wherein the one or more sensors are configured to sense one or more reader heads of the reading device.

12. An outputting element according to claim 11, wherein the controller is configured to determine a number of sensed reader heads of the reading device, and determine the second outputting mode based on the number of sensed reader heads determined.

13. An outputting element according to claim 11, wherein the controller is configured to estimate a distance between two or more sensed reader heads of the reading device, and determine the second outputting mode based on the estimated distance.

14. An outputting element according to claim 11, wherein a sensor of the one or more sensors is configured to sense a direction of travel of a reader head of the reading device, and the controller is configured to receive a signal from the sensor and determine the second outputting mode based on the signal.

15. An outputting element according to claim 9, further comprising:

a sensor configured to sense a presence of a metal, magnet or paramagnetic material, wherein the controller is configured to receive a signal from the sensor and determine the second outputting mode based on the signal received from the sensor.

16. An outputting element according to claim 9, wherein the outputting element has a plurality of coils positioned sequentially along a particular curve in the outputting element or on a surface of the outputting element, the controller is configured to determine an outputting mode wherein only a part of the coils are operated simultaneously, and the outputting element further includes a sensor configured to sense a position of a reader head of the reading device in relation to the outputting element.

17. An outputting element according to claim 16, wherein the controller is configured to operate the coils in accordance with an outputting mode wherein a particular coil of a group of coils, the group including all operated coils, has a particular relationship to the sensed position of the reader head of the reading device in relation to the outputting element.

18. An outputting element according to claim 16, wherein the controller is configured to operate the coils in accordance with an outputting mode wherein a group of neighboring coils are operated, the group of neighboring coils defining an overall length.

19. An outputting element according to claim 18, wherein the controller is configured to operate the coils in accordance with an outputting mode wherein the sensed position of the reader head is within 25% of a length from a center of the group of neighboring coils.

20. An outputting element according to claim 18, where the controller is configured to operate the coils in accordance with an outputting mode wherein the sensed position of the reader head is no less than 30% of a length from a center of the group of neighboring coils.

* * * * *